(12) United States Patent
Isaias et al.

(10) Patent No.: US 9,216,385 B2
(45) Date of Patent: Dec. 22, 2015

(54) APPLICATION OF REJECTION ENHANCING AGENTS (REAS) THAT DO NOT HAVE CLOUD POINT LIMITATIONS ON DESALINATION MEMBRANES

(75) Inventors: Nicos P. Isaias, Nicosia (CY); Anastasios J. Karabelas, Kalamarie (GR); Sultana T. Mitrouli, Thessaloniki (GR)

(73) Assignee: Saudi Arabian Oil Company, Dhahran (SA)

( * ) Notice: Subject to any disclaimer, the term of this patent is extended or adjusted under 35 U.S.C. 154(b) by 409 days.

(21) Appl. No.: 12/897,192

(22) Filed: Oct. 4, 2010

(65) Prior Publication Data

US 2012/0080058 A1    Apr. 5, 2012

(51) Int. Cl.
  B08B 3/08    (2006.01)
  B01D 65/06   (2006.01)
  B01D 61/02   (2006.01)
  B01D 65/08   (2006.01)
  (Continued)

(52) U.S. Cl.
  CPC .............. B01D 61/025 (2013.01); B01D 65/08 (2013.01); B01D 67/0088 (2013.01); C02F 1/441 (2013.01); B01D 2321/168 (2013.01); B01D 2323/283 (2013.01); B01D 2325/20 (2013.01); C02F 2303/16 (2013.01); C02F 2303/20 (2013.01)

(58) Field of Classification Search
  CPC .. B01D 61/025; B01D 65/08; B01D 67/0088; B01D 2321/168; B01D 2325/20; B01D 2323/283; C02F 2303/20; C02F 1/441; C02F 2303/16

USPC ............... 134/26, 27, 28, 29, 30, 22.1, 22.18, 134/22.16, 22.17, 22.19
See application file for complete search history.

(56) References Cited

U.S. PATENT DOCUMENTS

| 3,373,056 A | 3/1968 | Martin |
| 3,853,755 A | 12/1974 | Ganci |
| 3,877,978 A | 4/1975 | Kremen et al. |

(Continued)

FOREIGN PATENT DOCUMENTS

| EP | 0 082 705 A1 | 6/1983 |
| EP | 2 119 675 A1 | 11/2009 |
| JP | 10066972 A * | 3/1998 |

OTHER PUBLICATIONS

Du Pont Company, "Permasep" Products Engineering Manual, 1992, pp. 1-4, Bulletin 4030, Du Pont Company, Wilmington, DE.

(Continued)

Primary Examiner — Alexander Markoff
(74) Attorney, Agent, or Firm — Bracewell & Giuliani LLP; Constance G. Rhebergen; Kevin R. Tamm

(57) ABSTRACT

Methods of treating used or degraded reverse osmosis membranes post-production are provided. The membranes can be treated online or offline. The reverse osmosis membranes are cleaned and then contacted with a rejection enhancing agent solution that includes polyvinylpyrrolidone or polyvinylalcohol. The reverse osmosis membrane is then contacted with a tannic acid solution to produce a reconditioned reverse osmosis membrane having reduced defects. The treatment can take place at temperatures greater than 34° C. because the polyvinylpyrrolidone and polyvinylalcohol rejection enhancing agents used do not have cloud point limitations.

21 Claims, 13 Drawing Sheets

(51) Int. Cl.
    *B01D 67/00*     (2006.01)
    *C02F 1/44*     (2006.01)

(56) References Cited

U.S. PATENT DOCUMENTS

| | | | |
|---|---|---|---|
| 3,886,066 | A | 5/1975 | Chen et al. |
| 4,765,897 | A * | 8/1988 | Cadotte et al. ........... 210/500.23 |
| 4,812,270 | A | 3/1989 | Cadotte et al. |
| 4,828,700 | A | 5/1989 | Fibiger et al. |
| 4,909,943 | A * | 3/1990 | Fibiger et al. ................. 210/654 |
| 4,927,540 | A | 5/1990 | Wessling et al. |
| 6,177,011 | B1 | 1/2001 | Hachisuka et al. |
| 6,413,425 | B1 | 7/2002 | Hachisuka et al. |
| 6,814,865 | B1 | 11/2004 | Aminabhavi et al. |
| 6,821,430 | B2 | 11/2004 | Andou et al. |
| 7,094,349 | B2 | 8/2006 | Inoue et al. |
| 7,423,088 | B2 | 9/2008 | Mader et al. |
| 7,544,278 | B2 | 6/2009 | Aminabhavi et al. |
| 2001/0050252 | A1 * | 12/2001 | Mickols ........................ 210/490 |
| 2005/0014266 | A1 | 1/2005 | Shaw et al. |
| 2005/0077243 | A1 * | 4/2005 | Pinnau et al. ................. 210/652 |
| 2005/0147579 | A1 | 7/2005 | Schneider et al. |
| 2007/0021569 | A1 | 1/2007 | Willis et al. |
| 2008/0038241 | A1 | 2/2008 | Schasfoort et al. |
| 2008/0173583 | A1 | 7/2008 | Boodoo et al. |
| 2009/0050563 | A1 * | 2/2009 | Ruehr et al. .................. 210/636 |
| 2009/0159527 | A1 * | 6/2009 | Mickols et al. .......... 210/500.38 |
| 2009/0266762 | A1 * | 10/2009 | Ito et al. ........................ 210/636 |
| 2010/0133172 | A1 | 6/2010 | Song et al. |
| 2010/0193436 | A1 * | 8/2010 | Ruehr et al. .................. 210/636 |
| 2012/0048798 | A1 * | 3/2012 | Cheng et al. .................. 210/490 |

OTHER PUBLICATIONS

PCT International Search Report and Written Opinion dated Apr. 11, 2012, International Application No. PCT/IB2011/002782, International Filing Date Oct. 4, 2011.

* cited by examiner

APPLICATION OF REJECTION ENHANCING AGENTS (REAS) THAT DO NOT HAVE CLOUD POINT LIMITATIONS ON DESALINATION MEMBRANES

FIELD OF THE INVENTION

The present invention relates to methods for rejuvenating used or degraded reverse osmosis membranes.

BACKGROUND OF THE INVENTION

Reverse osmosis (RO) and nanofiltration (NF) membranes have been used extensively in water treatment, wastewater reclamation and separation of organic pollutants from aqueous streams in the last few decades. The reverse osmosis (RO) membrane of choice worldwide is the polyamide (PA) thin film composite membrane.

Most commercial NF and RO membranes have a composite structure consisting of three layers: a thin selective polyamide (PA) layer that is a few hundred nanometers in thickness, a microporous polysulfone support layer, and a nonwoven fabric layer for mechanical strength, as shown in FIG. 1(a). FIG. 1(b) depicts a transmission electron micrograph (TEM) of a virgin membrane where the dense PA layer and the porous polysulfone layer are clearly visible. This composite design renders possible the separate optimization of performance and mechanical stability. The thin selective layer is reportedly formed via interfacial polymerization of amine monomers (usually 1,3-benzenediamine or m-phenylene diamine (MPD)) in an aqueous solution reacting with trimesoyl chloride (1,3,5-benzentricarbonyl chloride (TMC)) in an organic solvent, according to the chemical reaction depicted in FIG. 2. This technique is based on a polycondensation reaction between two monomers, the polyfunctional amine and the acid chloride, which are dissolved in immiscible solvents. The aqueous amine solution initially impregnates the support. An ultrathin film (skin), with thickness under half a micron, is quickly formed at the interface and remains attached to the support. The reaction is believed to take place at the organic side of the interface due to the negligible solubility of acid chlorides in water and the good solubility of amines in organic solvents. In this reaction scheme, both the amine and acid chloride monomers are aromatic, and the three —COCl groups in the trimesoyl chloride allow the resulting fully aromatic PA membrane to be highly crosslinked, which is important for the high salt rejection required by RO membranes. The polyamide layer formed in this way is relatively rough, due to the ridge-and-valley structures [see FIG. 1(b)] with a roughness in the range of 100 nm.

Although the membrane performance is generally characterized as very good to excellent, significant membrane deficiencies may exist that can contribute to reduced membrane life and higher operating costs. Some indicators of membrane performance decline include an increase in the salt passage (i.e., reduction in salt rejection), an increase of differential pressure, and a reduction in permeate (product) flow. The disadvantages reported also include lack of chemical stability to oxidants such as chlorine, high fouling rates due to surface roughness, and high bacteria attachment on the membrane surface leading to bio fouling. Moreover, additional deficiencies can also include pinholes, defects, or similar 'weak' spots on the skin, due to non-uniform coverage during the manufacturing process, which tend to be aggravated with operating time and after repeated contact with cleaning chemicals. These drawbacks lead to membrane performance deterioration and increased frequency of replacement.

The physicochemical properties of NF/RO membrane active layers such as surface roughness, thickness, chemical functionality, charge and degree of cross-linking affect interactions with water and solutes, thus impacting on membrane performance. PA membranes have a relatively high degree of surface roughness, usually determined by characterization through Atomic Force Microscopy (AFM) and Scanning Electron Microscopy (SEM) (FIGS. 3 and 4). These figures show that the PA membrane (FIG. 3) has a ridge-valley type of structure, while for the XLE membrane (FIG. 4), which has been characterized as a fully aromatic membrane, the mean roughness has been estimated to be 73 nm, whereas the reported RMS roughness is 142.8 nm. For other membranes, the RMS roughness was estimated to be 117 nm. Recent studies have shown that membrane surface morphology and structure influence performance characteristics of membranes. It has been suggested that an approximately linear relationship exists between membrane surface roughness and permeate flux for crosslinked aromatic polyamide reverse osmosis (RO) membranes, where permeability increases with increasing surface roughness. The linear relationship is attributed to surface unevenness of the RO membrane skin layer, which results in enlargement of the effective membrane area.

The physicochemical properties of a very thin PA active layer essentially determines the performance (flux and rejection) of thin film composite (TFC) membranes. For example, membrane zeta potential has been used to correlate the transport of some trace organic solutes through RO and NF membranes. In addition, the flux performance and fouling behavior of a membrane may also be affected by its zeta potential. Other properties, such as the chemical composition and morphology of the polyamide layer, are also important to RO membrane performance. Consequently, very good understanding of the physicochemical properties of the polyamide layer becomes critical for developing methods to control membrane fouling and trace organics rejection. Unfortunately, the processes and exact chemistries for producing commercial RO membranes are generally proprietary, which greatly limits membrane users' understanding of the physical and chemical properties of these membranes.

It has been recognized long ago that weak spots or defects (pin holes) are not uncommon on the membrane surface, which naturally tend to degrade membrane element rejection characteristics. Recent research has shown that the PA active layer thickness is characterized by great spatial nonuniformity, exhibiting variations of the porosity and charge across the layer. The active layer mean thickness for well-known membranes in the market, varies in the range 100 nm-300 nm with a minimum thickness that may be as small as 50 nm. Furthermore, it is well-known that due to periodic chemical cleaning, membrane aging, and occasional chlorine attack, there is gradual membrane degradation, very likely due to weak spots or defects of the active layer. Membranes are subject to fouling, scaling, and aging, which all affect the membrane performance. Membrane aging and degradation are considered a manifestation of physico-chemical changes occurring in the active layer (i.e., agglomeration and clustering of polymeric species) that lead to reduced salt rejection.

Attempts have been made to apply a post-treatment, in the manufacturing process of hollow fiber membrane elements ("permeators") used for brackish and seawater desalination, respectively. In this treatment, PT-A (polyvinyl methyl ether) and PT-B (tannic acid) were used. It was reported that PT-A increased salt rejection by reducing salt flow through membrane or fiber imperfections; PT-B was considered to be adsorbed on the membrane surface, thus enhancing salt rejection. The attempts at post-treatment of membrane systems, however, were only performed on hollow fiber membrane elements, not other types of membranes, such as spiral wound elements.

A need exists for a process that can be used post-manufacturing to help rejuvenate used or degraded membranes. It would be helpful if such processes could be used on various types of membranes, such as spiral wound membranes.

SUMMARY OF THE INVENTION

In view of the foregoing, methods of treating used or degraded reverse osmosis membranes are provided as embodiments of the present invention. For example, a method of treating a reverse osmosis membrane is provided as an embodiment of the present invention. This embodiment is particularly useful when the reverse osmosis membrane is used or degraded. This embodiment can be used when the reverse osmosis membrane is offline.

In this embodiment, the reverse osmosis membrane is first cleaned. The reverse osmosis membrane is then contacted with a rejection enhancing agent (REA) solution comprising polyvinylpyrrolidone (PVP) or polyvinylalcohol (PVA) and water for a predetermined time period under a predetermined applied trans-membrane pressure. The water can be RO product water. Following the REA solution, the reverse osmosis membrane is contacted with a tannic acid solution under the predetermined applied trans-membrane pressure to produce a reconditioned reverse osmosis membrane having reduced defects. The pressure can be the same or different in each of the contacting steps in this method.

As another embodiment of the present invention, a method of treating a reverse osmosis membrane is provided. Similar to the first embodiment, this embodiment is useful when the reverse osmosis membrane is used or degraded and is offline.

In this embodiment, the reverse osmosis membrane is first acid cleaned at a first predetermined pH value. Following the acid cleaning, the reverse osmosis membrane is alkaline cleaned at a second predetermined pH value. The reverse osmosis membrane is then contacted with a REA solution comprising polyvinylpyrrolidone or polyvinylalcohol, sodium chloride, and water for a predetermined time period under a predetermined applied trans-membrane pressure. The water can be RO product water. Following the REA solution, the reverse osmosis membrane is contacted with a tannic acid solution comprising tannic acid and citric acid under the predetermined applied trans-membrane pressure to produce a reconditioned reverse osmosis membrane having reduced defects.

Besides embodiments that are useful when the reverse osmosis membrane is offline, embodiments of the present invention are also provided for use when the reverse osmosis membrane remains online. For example, a method of treating a reverse osmosis membrane is provided. In this embodiment, a concentrated REA solution comprising polyvinylpyrrolidone or polyvinylalcohol is injected into a feed-water stream for a predetermined time period so that the REA solution at the predetermined concentration contacts the reverse osmosis membrane. Following the REA solution, a tannic acid solution is injected into the feed-water stream for a predetermined time period so that the tannic acid solution contacts the reverse osmosis membrane.

The reverse osmosis membranes of the present invention can be desalination membranes. After being treated with the method embodiments of the present invention, the membranes are enhanced with respect to their salt rejection performance. In an aspect, the post-treatment of degraded membranes in accordance with embodiments of the present invention can increase salt rejection from about 92% to about 98%. The new REA agents do not exhibit a cloud point and therefore can be used for coating membranes at higher temperatures. In an aspect, the methods described herein can be used in applications having water temperatures in a range of about 34° C. to about 60° C., unless other factors, such as the maximum allowable temperatures of the membranes, limit the maximum temperatures in which the methods can be used.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be provided by reference to the embodiments thereof that are illustrated in the drawings that form a part of this specification. It should be noted, however, that the appended drawings illustrate some embodiments of the invention and are, therefore, not to be considered limiting of the invention's scope, for the invention can admit to other equally effective embodiments.

FIG. 1(*b*) illustrates a transmission electron micrograph (TEM) of a virgin membrane that can be used in embodiments of the present invention, which is from C. Y. Tang, Y. N. Kwon, J. O. Leckie, *Probing the nano- and micro-scales of reverse osmosis membranes—A comprehensive characterization of physiochemical properties of uncoated and coated membranes by XPS, TEM, ATR-FTIR, and streaming potential measurements*, J. of Membrane Science 287 (2007) 146-156;

DETAILED DESCRIPTION OF THE INVENTION

Figure 1A:
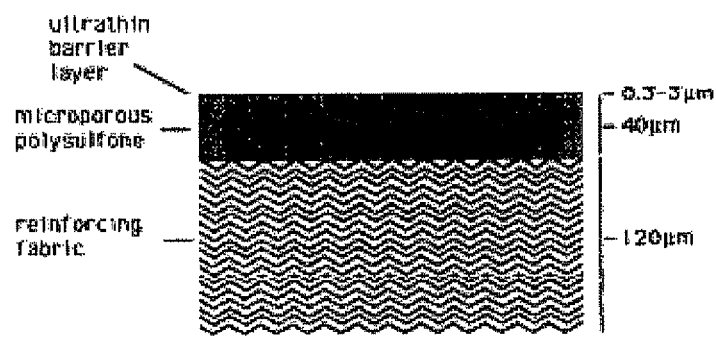
FIG. 1(*a*) illustrates a typical reverse osmosis membrane that can be used in embodiments of the present invention, which is from R. J. Petersen, *Review article: Composite reverse osmosis and nanofiltration membranes*, J. of Membrane Science 83 (1993) 81-150.
Figure 1B:
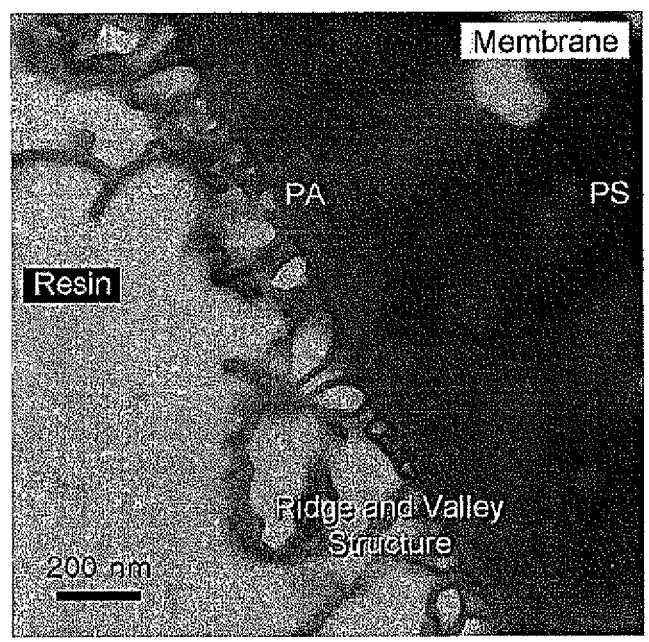
Figure 2:
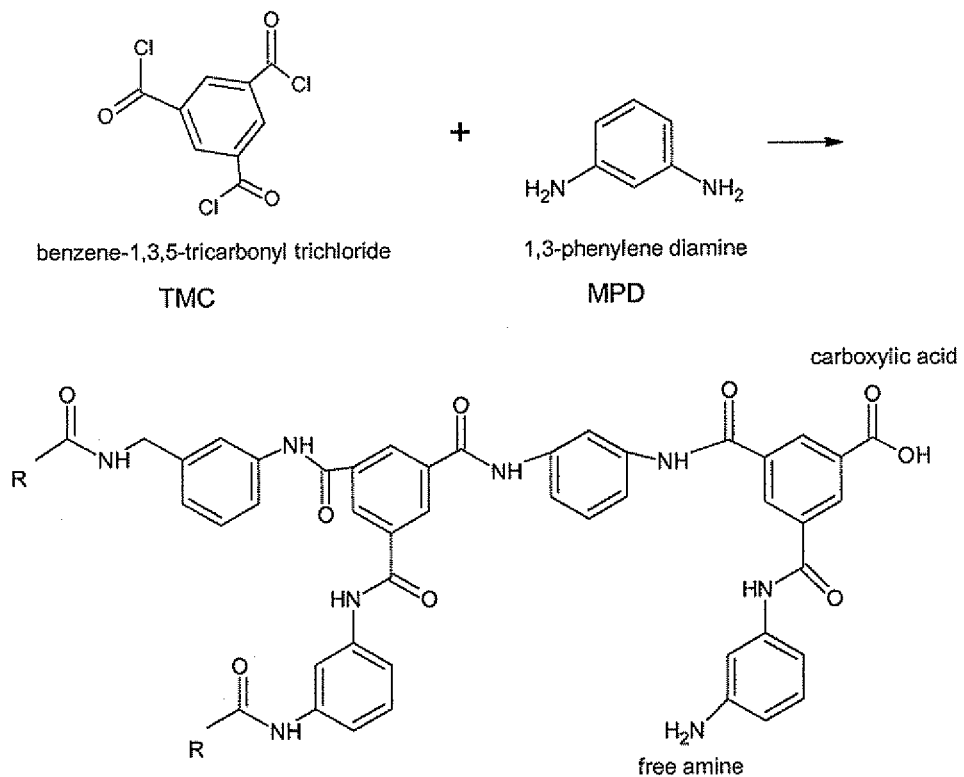
FIG. 2 is a schematic of a common interfacial polymerization chemical reaction that can be used to produce the thin selective polyamide layer of a typical reverse osmosis membrane that can be used in embodiments of the present invention.
Figure 3:
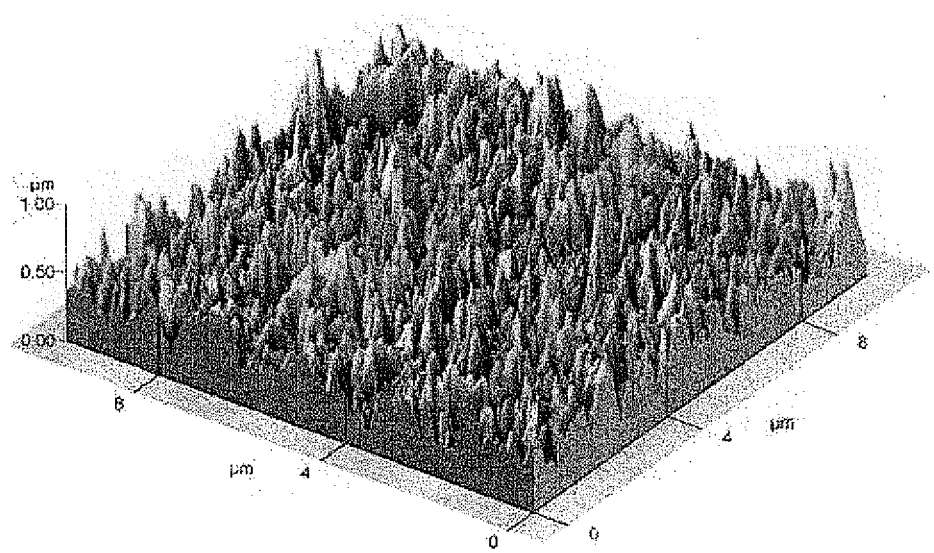
FIG. 3 is a 3-D atomic force microscopy topography of the surface of a commercial polyamide (TMC/MPD) reverse osmosis membrane that can be used in embodiments of the present invention, which is from R. L. Riley, H. Ridgway, K. Ishida, *Polyamide Reverse Osmosis Membrane Fouling and Its Prevention: Oxidation-Resistant Membrane Development, Membrane Surface Smoothing and Enhanced Membrane Hydrophilicity*, SST Report No 1098-1, Final Report Sep. 13, 2000.
Figure 4:
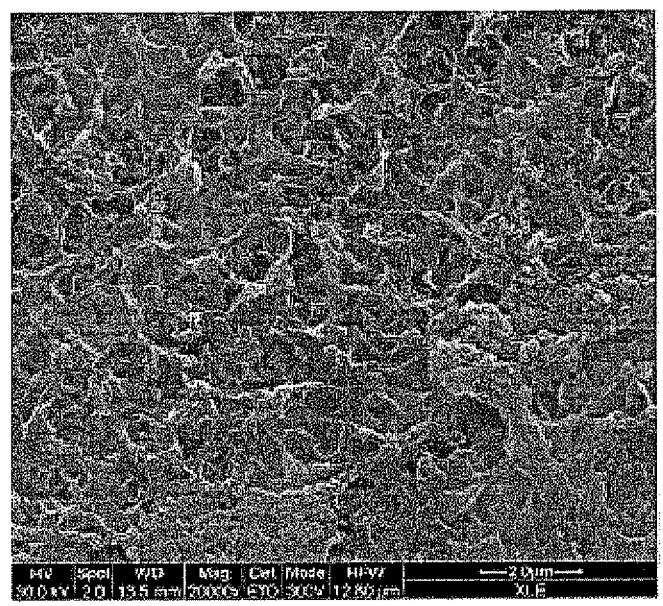
FIG. 4 is a scanning electron microscopy (SEM) micrograph of a virgin extra low energy reverse osmosis membrane that can be used in embodiments of the present invention, which is from P, Xu, J. Drewes, *Viability of nanofiltration and ultra-low pressure reverse osmosis membranes for multi-beneficial use of methane produced water*, Separation and Purification Technology 52 (2006) 67-76.

Methods of treating used or degraded reverse osmosis membranes are provided as embodiments of the present invention. For example, a method of treating a reverse osmosis membrane is provided as an embodiment of the present invention. This embodiment is particularly useful when the reverse osmosis membrane is used or degraded. This embodiment can be used when the reverse osmosis membrane is offline without the need of a cooling coil to reduce the water temperature in the post-treatment circulation tank, as is required with other types of REA compounds. The REA compounds of the present invention are unaffected by temperature because they do not show a cloud point.

In this embodiment, the reverse osmosis membrane is first cleaned. The reverse osmosis membrane is then contacted with a rejection enhancing agent (REA) solution comprising polyvinylpyrrolidone (PVP) or polyvinylalcohol (PVA) and water for a predetermined time period under a predetermined applied trans-membrane pressure. The water can be RO product water. Following the REA solution, the reverse osmosis membrane is contacted with a tannic acid solution under the predetermined applied trans-membrane pressure to produce a reconditioned reverse osmosis membrane having reduced defects.

The method embodiments of the present invention include post-treatment procedures in order to form a kind of coating layer, and specifically to seal off pinholes or other defects on the membrane active layer. Fouling and scaling substances can be removed from the membrane surface by chemical cleaning. The main purpose of chemical cleaning is to reduce the differential pressure of the membranes by removing the foulants and sealants and to restore the product flow. The product quality of the membrane is not improved much by chemical cleaning unless a coating is applied to seal off any pin holes of the "active layer", to seal off any scratches and generally seal off all of the weak points of the membrane surface that allow salt passage. Post-treatment of the membrane surface should take place after chemical cleaning so that the coating is directly applied on the membrane surface and not on top of the foulants or sealants.

A goal of the present invention is to improve high pressure and low pressure reverse osmosis membrane performance in terms of salt rejection, by post-treatment with chemical additives. The invention can be applied to all types of membranes such as hollow fine fiber membranes and the flat sheet thin-film composite (TFC) polyamide reverse osmosis membranes which are mainly in the spiral wound module configuration and are presently the most widely used.

The term "rejection enhancing agents" is used herein to refer to compounds that, when applied to reverse osmosis membranes, increase their rejection. The aim is to increase rejection with minimal decline in the flux. The REA agents of the present invention are believed to selectively plug microscopic leaks and defects in the membrane discriminating layer. The preferred agents can even seal the porous support where discontinuities exist in the discriminating layer. The prior art techniques can be used to significantly reduce salt passage through reverse osmosis membranes but generally result in a significant loss of water flux through the membrane.

The discovery of the new coating compounds PVP and PVA offers much more flexibility in carrying out the membrane post-treatment process. Post-treatment can be carried out off line without the use of cooling coil to reduce the temperature of stock REA in the circulation tank to avoid the cloud point of the post-treatment chemical; more important, the post-treatment is also possible online under high flow rate and high operation pressure, without loss of desalinated water production.

As another embodiment of the present invention, a method of treating a reverse osmosis membrane is provided. Similar to the first embodiment, this embodiment is useful when the reverse osmosis membrane is used or degraded and is offline.

In this embodiment, the reverse osmosis membrane is first acid cleaned at a first predetermined pH value. Following the acid cleaning, the reverse osmosis membrane is alkaline cleaned at a second predetermined pH value. The reverse osmosis membrane is then contacted with a REA solution comprising polyvinylpyrrolidone or polyvinylalcohol, sodium chloride, and water for a predetermined time period under a predetermined applied trans-membrane pressure. The water can be RO product water. Following the REA solution, the reverse osmosis membrane is contacted with a tannic acid solution comprising tannic acid and citric acid under the predetermined applied trans-membrane pressure to produce a reconditioned reverse osmosis membrane having reduced defects.

Besides polyvinylpyrrolidone or polyvinylalcohol, other compounds can be included in the REA solution. For example, in an aspect, the REA solution can also include sodium chloride. Various other compounds can be included in the REA solution, as will be apparent to those of skill in the art and are to be considered within the scope of the present invention.

Besides tannic acid, other compounds can be included in the tannic acid solution. For example, in an aspect, the tannic acid solution can also include citric acid. Various other compounds can be included in the tannic acid solution, as will be apparent to those of skill in the art and are to be considered within the scope of the present invention.

The amounts of the compounds contained in the REA solution can be varied, as needed. For example, the polyvinylpyrrolidone or polyvinylalcohol can be present in a range of about 5 ppm to about 30 ppm of the REA solution. As another example, the sodium chloride can be present in a range of about 30 ppm to about 200 ppm. Other suitable amounts of compounds contained in the REA solution will be apparent to those of skill in the art and are to be considered within the scope of the present invention.

Similar to the REA solution, the amounts of the compounds contained in the tannic acid solution can be varied, as needed. For example, the tannic acid can be present in a range of about 5 ppm to about 30 ppm. As another example, citric acid can be present in a range of about 0.06 wt. % to about 0.38 wt. %. Other suitable amounts of compounds contained in the tannic acid solution will be apparent to those of skill in the art and are to be considered within the scope of the present invention.

More specifically, during offline application of the REA compounds, sodium chloride should be diluted in the REA aqueous solution at a concentration in a range of about 30 ppm to about 200 ppm, depending on the concentration of the REA compound. On the other hand, the TA solution (either in offline or in online mode), is prepared by diluting tannic acid and citric acid in distilled water. Citric acid should be added at a concentration of about 0.06 wt. % to about 0.38 wt. % for solutions containing from about 5 ppm to about 30 ppm TA, respectively. Tannic acid should be in chemically uncombined form for effective membrane coating stabilization; specifically, the TA solutions brought into contact with membranes should be either substantially free of other tannin-reactive materials, or should contain tannins in excess of the amount required to react with any small amount of tannin-reactive materials that may be present in the solution, or should contain agents that prevent chemical reaction between tannins and otherwise tannin-reactive materials. Citric acid is considered to form stable and soluble complexes with the tannin-reactive compounds, such as dissolved salts and colloidal hydrous compounds of heavy metals, such as copper, tin, lead, iron, chromium, and nickel, that can be present in feed water in small quantities.

Various process conditions can be varied in embodiments of the present invention. For example, the time period in which the reverse osmosis membrane is contacted by the REA solution or the tannic acid solution can vary between about 15 minutes to about 30 minutes. In an aspect, the predetermined time period can be about 30 minutes. As another example, the predetermined applied trans-membrane pressure can be varied between about 150 psi to about 200 psi. Nevertheless, during online application, these compounds can be injected into the feed water stream without needing to change the applied pressure of normal plant operation. The pressure of 150 psi is considered to be a common practice for brackish water applications, Other suitable time periods for contact and operating pressures will be apparent to those of skill in the art, as will also be other suitable process conditions that can also be varied. Other suitable process conditions are to be considered within the scope of the present invention.

Various methods can be used to clean the reverse osmosis membranes. The chemical cleaning should be made according to the membrane manufacturer's recommendations. For example, the step of cleaning the reverse osmosis membrane can include the steps of acid cleaning the reverse osmosis membrane at a first predetermined pH value; and then alkaline cleaning the reverse osmosis membrane at a second predetermined pH value. In an aspect, the first predetermined pH value is about 4. In another aspect, the step of alkaline cleaning can be performed using sodium tri-polyphosphate and ethylenediamine tetraacetic acid (EDTA) or sodium hydroxide (NaOH) and the second predetermined pH value can range from about 10 to about 10.5. Various other methods of cleaning the reverse osmosis membrane and other suitable pH ranges will be apparent to those of skill in the art and are to be considered within the scope of the present invention.

Besides embodiments that are useful when the reverse osmosis membrane is offline, embodiments of the present invention are also provided for use when the reverse osmosis membrane remains online. For example, a method of treating a reverse osmosis membrane is provided. In this embodiment, a concentrated REA solution comprising polyvinylpyrrolidone or polyvinylalcohol is injected into a feed-water stream for a predetermined time period so that the REA solution at the predetermined concentration contacts the reverse osmosis membrane. Following the REA solution, a tannic acid solution is injected into the feed-water stream for a predetermined time period so that the tannic acid solution contacts the reverse osmosis membrane.

Because this embodiment can be used when the reverse osmosis membrane is online, the methods of the present invention can be used in warm waters like the waters encountered in the Arabian Gulf countries and other places around the world. Furthermore, it is believed that because the REA compositions can be applied online in warm waters, it will enhance the coating coherence to the membrane, because the coating is applied under the higher pressures available during plant operation, in both brackish and seawater desalination plants. It is believed that the higher the applied pressure, the better the coating durability. As an added advantage, applying the REA compositions of the present invention online results in no water production losses.

Although both types of applications are useful and effective, online post-treatment is more effective than offline treatment because of higher pressure applications that are available during plant operation. Online post-treatment was not possible with warm waters using prior art compositions because it is not practical to cool down the required large water volume.

The methods of the present invention can be used in a variety of temperature ranges. In an aspect, the methods described herein can be used in applications having water temperatures in a range of about 34° C. to about 60° C. Although the compositions of the present invention can be used in temperatures of up to about 60° C., they cannot be used at this high of a temperature with various reverse osmosis membranes, such as polyamide spiral wound membranes, because the maximum temperature that the membranes can tolerate is about 45° C. The REA compositions of the present invention do not show cloud point.

The rejection enhancing agent can be applied to the membrane via any conventional or convenient technique. For many reagents a contact time of about 15 to 30 minutes is typically required to achieve the desired increase in rejection. Of course, optimum contact will vary depending upon the membrane, the coating agent and other factors. If desired, more than one rejection enhancing agent can be sequentially applied. It may be desirable, after coating with rejection enhancing agents, to rinse the discriminating layer surface with water to remove any excess agent deposited on the membrane.

The reverse osmosis membranes of the present invention can be desalination membranes. After being treated with the method embodiments of the present invention, the membranes are enhanced with respect to their salt rejection performance. In an aspect, post-treatment of degraded membranes in accordance with embodiments of the present invention can increase salt rejection from about 92% to about 98%. The new REA agents do not show cloud point and therefore can be used for coating membranes that operate at higher temperatures.

The phenomenon of a "cloud point" is quite different from simply a negative temperature coefficient of solubility and is believed to arise from the sudden dispersion of the molecule's protective hydration sheath, thereby exposing the hydrophobic character of the compound and resulting in its exclusion (precipitation) by the surrounding solvent water; this mechanism seems, in some respects, analogous to protein denaturation.

Reverse Osmosis Membrane

The most important requirement in desalinated water, to be used as make-up water for boilers, is the product quality. When the reverse osmosis membranes are first commissioned, usually they produce water quality from the $1^{st}$ pass to satisfy drinking water requirements and water quality water from the $2^{nd}$ pass to satisfy boiler water make-up. However, after some time the membranes do not produce the required product quality because of membrane ageing, development of imperfections and degradation due to chemical cleaning. Previously, the only solution was to replace the membranes. The post-treatment of membranes in accordance with embodiments of the present invention extends the useful life of the membranes by providing product water meeting the specifications over a much longer period of time, thus avoiding the cost of membrane replacement.

Embodiments of the present invention can be used with various types of reverse osmosis membranes. One such suitable membrane is a thin film composite polyamide membrane. The TFC polyamide membrane, which is the most widely used, is generally manufactured in a two-step process. In the first step, a porous support, typically polysulfone, is cast onto a support fabric, following by in situ interfacial polymerization of an ultra thin film upon the polysulfone support in the second step.

The formation of this ultra thin film, which is generally 0.1-0.2 microns in thickness, provides the membrane with a rejecting barrier. This rejecting barrier, which is very thin, is in fact not uniform in thickness but exhibits a relatively high degree of surface roughness, that can be seen through Atomic Force Microscopy (AFM) and Scanning Electron Microscopy (SEM). It exhibits "hills and valleys" and minimum thickness as low as 0.05 microns in the "valleys." Therefore, this thin-film known as the "membrane active layer," which performs the desalination, exhibits weak spots or defects (pin holes), which degrade the membrane rejection characteristics. Furthermore, it is well-known that due to periodic chemical cleaning, membrane aging, and occasional chlorine attack, there is gradual membrane degradation, very likely due to weak spots or defects of the active layer. As indicated previously, membrane aging and degradation are considered a manifestation of physicochemical changes occurring in the active layer (i.e., agglomeration and clustering of polymeric species) that lead to reduced salt rejection. As a result of this membrane degradation, the salt rejection of the membrane decreases, i.e. the salt passage through the membrane increases. With the reverse osmosis desalination membranes being used to produce water of good enough quality for boiler make-up and other similarly demanding uses, maintaining quality is of paramount importance. Previously, the primary way to maintain the quality of the reverse osmosis membranes' product was to replace the membranes on a frequent basis, which is not cost effective. Other suitable types of membranes that can be used in embodiments of the present invention will be apparent to those of skill in the art and are to be considered within the scope of the present invention.

It is believed that post-treatment of membranes is not used commercially for spiral wound flat sheet membranes presumably because it is assumed that it is difficult to apply the coatings on a flat membrane surface and sustain it for long periods. Experiments were performed using the methods of the present invention that show that the membrane coatings have been sustained for 30 days without deterioration in salt rejection.

Polyvinyl Pyrrolidone (PVP)

Polyvinyl pyrrolidone (PVP) is one of the components of the REA solution of the present invention. PVP is a water-soluble polymer made from the monomer N-vinyl pyrrolidone, as indicated in the following structure:

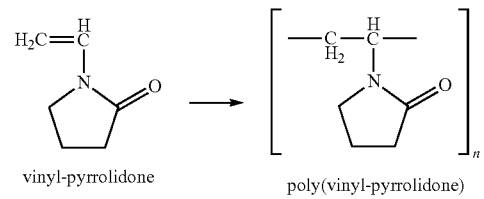

vinyl-pyrrolidone      poly(vinyl-pyrrolidone)

In solution, it has excellent wetting properties and readily forms films. It is widely used for hydrophilizing biomaterials and industrial membrane materials. It is generally regarded as a non-toxic synthetic polymer; thus it can be used in processes for portable water production.

Polyvinyl Alcohol (PVA)

Polyvinyl alcohol (PVA) is component of the REA solution of the present invention. PVA has the following chemical structure:

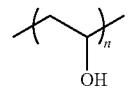

It is a white, odorless granular powder that is soluble in water and insoluble in aliphatic and aromatic hydrocarbons, esters, ketones, and oils. PVA is produced by polymerization of vinyl acetate with subsequent controlled hydrolysis of the resulting polyvinyl acetate. According to the U.S. Food and Drug Administration, PVA is included in the category of Substances Generally Recognized as Safe (GRAS) for use in food additives.

Tannic Acid

Tannic acid is another component used in embodiments of the present invention. Tannic acid is a typical hydrolyzed tannin characterized as $C_{76}H_{52}O_{46}$ (M=1701 g/mol) composed of five gallic acid units as shown in the following compound:

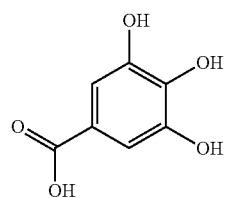 [SMILES: O=C(O)c1cc(O)c(O)c(O)c1]

with each unit being ester-linked to a pentagalloyl glucose core as shown in the following structure:

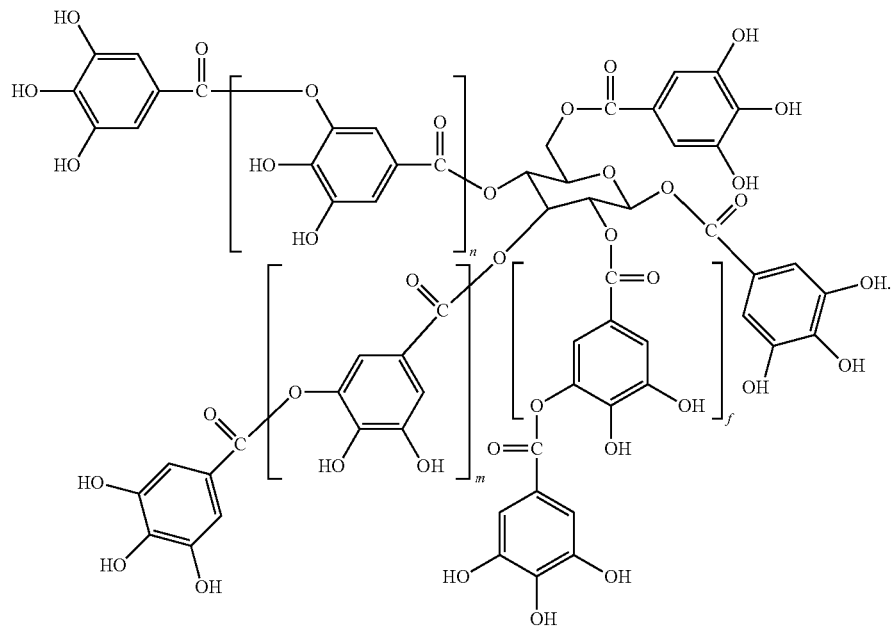

(l, m, n = 0, 1, 2 or 3)

Tannic acid is an amorphous powder, glistening scales or spongy mass, varying in colour from yellowish white to light brown; odourless or with a faint, characteristic odor, soluble in water, acetone and ethyl alcohol whereas insoluble in benzene, chloroform and ether. Tannic acid can spoil when it is exposed to air for a long time. Therefore, it should be stored in a cool dry place, in a tightly closed vessel.

Tannic acid solution is a negatively charged colloid, considered to form ionic bonds with cationic colloids or hydrogen bonds with proton accepting colloids like PVME.

Citric Acid

Another component used in embodiments of the present invention is citric acid. Citric acid is a hydroxyl-tricarboxylic acid with the general formula $C_6H_8O_7$ as follows:

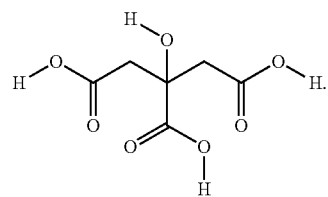

It is available primarily as anhydrous material but also as the monohydrate. The major commercial salts are sodium and potassium, with calcium, diammonium, and ferric ammonium (complex) also available. Citric acid is a relatively strong organic acid, and is very soluble in water. Citric acid and its salts are widely used because they are non toxic, safe to handle, and easily biodegradable. Citric acid occurs in relatively large quantities in citrus fruits. It also occurs in other fruits, in vegetables, and in animal tissues and fluids either as the free acid or as citrate ion. It is an integral part of the Krebs (citric acid) cycle involving the metabolic conversion of carbohydrates, fats, and proteins in most living organisms. Citric acid is generally produced in large quantities by an industrial process based on aerobic fermentation of natural raw materials rich in sugars and dextrose.

The Role of Citric Acid as an Additive

Very dilute solutions of hydrolyzable tannins have been found to be effective in reducing solute passage through semipermeable membranes in the desalination processes. To achieve this, it has been found that a portion of tannins must be in chemically uncombined form when contacted with the membranes. Thus, in practice, the solutions brought into contact with water-wet membranes must be either substantially free of other tannin-reactive materials, or must contain tannins in excess of the amount required to react with any small amount of tannin-reactive materials that may be present, or must contain agents that prevent chemical reaction between tannins and otherwise tannin-reactive materials. Tannin-reactive materials, which are frequently associated with permselective membrane systems, include dissolved salts and colloidal hydrous compounds of heavy metals such as copper, tin, lead, iron, chromium, and nickel. Such materials are frequently present in small quantities in waters that have been exposed to brass, bronze, iron, steel, and non-rusting alloy pipes and fittings and are therefore present in waters to which permselective membranes are exposed.

Hydrolyzable tannins are quite reactive chemically with such dissolved and colloidal hydrous metal compounds. In treating permselective membranes in systems containing small amounts of tannin-reactive materials, it is usually desirable to include in the contacting solution, along with a hydrolyzable tannin, one or more agents that prevent reaction between the tannin and such materials. These agents include mineral and organic acids that form relatively stable and soluble compounds or complexes with heavy metals. Preferred agents are chelating materials commonly used to complex or sequester soluble heavy metals in aqueous solutions, e.g., ethylene-diamine-tetra-acetic acid and related compounds, and also the organic acids and their ammonium, alkali, and alkaline earth metal salts that are commonly used to dissolve colloidal hydrous heavy metal compounds in aqueous systems, e.g. oxalic, citric, maleic, fumaric, and ascorbic acids. Such agents are useful at concentrations between about 0.1 and 2 weight percent in contacting solutions containing between about 0.001 and 0.05 weight percent of hydrolyzable tannins. Citric acid and its soluble salts are preferred agents for the above described function.

As an advantage of the present invention, the new REA coating compounds do not show cloud point and therefore can be used for coating membranes at higher temperatures, unlike prior art REA agents in the desalination industry, which can only be applied at temperatures below 34° C. At temperatures higher than about 34° C., prior art REA agents, such as PVME, exhibit cloud point, which makes them ineffective as a membrane coating agent.

As another advantage, the REA compositions of the present invention are approved by the U.S. Food and Drug Administration (FDA), thus allowing their application in potable water treatment plants and similar systems. Additional advantages of embodiments of the present invention include the fact that the membrane post-treatment can take place offline without the need of a cooling coil to reduce the water temperature in the post-treatment circulation tank. Similarly, the membrane post-treatment can be applied online for warm waters like the waters encountered in the Arabian Gulf countries and other places around the world. Membrane post-treatment application online in warm waters can enhance the coating application itself because of the application of higher pressures during plant operation, whether this is brackish or seawater operation. Furthermore, membrane post-treatment applications online also result in no water production loss.

As another benefit of using embodiments of the present invention, the amount of REA compounds required for the post-treatment of membranes in the present invention is only a fraction of what was thought in the past. Applying higher amounts of coating compounds, such as 80 mg/L in previously offline post-treatments, appears to be detrimental to the reverse osmosis process as it reduces the membrane flux (membrane permeation) and necessitates the application of higher pressure during desalination, without any benefits in salt rejection improvement.

As yet another advantage of the present invention, the methods described herein for restoring or enhancing performance of reverse osmosis membranes after manufacture make the operation of such membranes more economical and reduce the production of membranes that do not meet the requisite performance specifications.

EXAMPLES

Two different types of membranes were tested to show the effectiveness of the REA compositions of the present invention. The following protocol was used during cross flow testing: 1) Membrane preparation; 2) Determination of initial membrane flux; 3) Chemical cleaning with low pH solution; 4) Chemical cleaning with high pH solution; 5) Membrane compaction/conditioning; 6) Determination of flux and salt rejection after chemical cleaning; 7) Coating with PVP or PVA and/or tannic acid by application of 5-30 mg/l PVP or PVA for 30 mins at 150 psi pressure, followed by good flushing followed by tannic acid application of 5-30 mg/L at 150 psi pressure, for 30 minutes; 8) Determination of flux after treatment; and 9) Determination of salt rejection/salt passage after treatment.

Rejection Enhancing Agents

Tannic acid was purchased from Aldrich and has a molecular weight of 1701.18 g/mol. Polyvinylpyrrolidone (PVP) was purchased from Aldrich in a powder form and with an average $M_w$~55.000 g/mol. Partially hydrolyzed grades of PVA (degree of hydrolysis 87-89%) of average molecular weight 85,000-124,000 g/mol were purchased from Sigma-Aldrich and used for the coating application.

Tested Membranes

Two types of aromatic polyamide based thin film composite (TFC) brackish water RO membranes, ULPRO XLE (Dow Filmtec) and CPA2 (Hydranautics), were used in the Experiments to illustrate the possible salt rejection improvement due to coating application in accordance with embodiments of the present invention. Furthermore, membrane coupons were obtained from a used element (CPA2 membrane) that was in operation for approximately 3 years, treating brackish well water before it was discarded. The used element was the third one in a vessel of first stage, first pass and was cleaned five times prior to using it in the Experiments. Samples of membrane in the dimensions of the test sections were cut from the spiral wound element, and after rinsing with distilled water, were stored in solution of 0.75% $Na_2S_2O_5$ (sodium metabisulfite) and kept in a refrigerator at about 5° C.

The active layer of CPA2 membrane is essentially a copolyamide from the reaction of 1,3-benzenediamine with a blend of isophthaloyl and trimesoyl chlorides. Both XLE and CPA2 membranes are thin film composite polyamide membranes. The active aromatic layer is supported by a porous polysulfone layer reinforced with a non-woven polyester fabric. Tables 1 and 2 include manufacturer specifications and operating limits, referring to the entire element.

TABLE 1

Specifications of brackish water reverse osmosis membranes (XLE and CPA2).

| Product | Active Area ft² (m²) | Applied Pressure psig (bar) | Permeate Flow Rate gpd (m³/d) | Stabilized Salt Rejection (%) |
|---|---|---|---|---|
| XLE | 28 (2.6) | 100 (6.9) | 850 (3.2) | 99.0 |
| CPA2 | 85 (7.9) | 225 (15.5) | 2250 (8.5) | 99.2 |

In Table 1, the permeate flow and salt rejection for the XLE membrane were based on the following test conditions: 500 ppm NaCl feedstream, pressure specified above, 77° F. (25° C.) and recovery rate 15%. NaCl was added during membrane treatment with PVA or PVP to be able to monitor the progress of coating by continuously measuring the permeate conductivity. It is not an ingredient to be used with the REAs. The permeate flows for individual elements can vary +/−20%. The permeate flow and salt rejection for the CPA2 membrane were based on the following test conditions: 1,500 ppm NaCl solution, 225 psi (1.55 MPa) Applied Pressure, 77° F. (25° C.) Operating Temperature, 15% Permeate Recovery, and 6.5-7.0 pH range. The permeate flow for individual elements of the CPA2 membrane can vary +33% or −15%.

TABLE 2

Operating limits of ULPRO XLE and CPA2 membranes

| Parameter | Membrane type | |
|---|---|---|
|  | XLE | CPA2 |
| Maximum Operating Temperature | 113° F. (45° C.) | 113° F. (45° C.) |
| Maximum Operating Pressure | 600 psig (41 bar) | 600 psig (4.16 MPa) |
| Maximum Pressure Drop | 13 psig (0.9 bar) | 10 psig |
| pH Range, Continuous Operation | 2-11 | 3-10 |
| pH Range, Short-Term Cleaning | 1-13 | — |
| Maximum Feed Silt Density Index (15-min) | SDI < 5 | 5.0 |
| Free Chlorine Tolerance | <0.1 ppm | <0.1 ppm |
| Maximum Feedwater turbidity | — | 1.0 NTU |
| Maximum Feed Flow | — | 16 GPM (3.6 m³/h) |
| Minimum Ratio of Concentrate to Permeate Flow for any Element | — | 5:1 |

Additional physicochemical characteristics of the XLE membrane are summarized in Table 3.

TABLE 3

Physiochemical Characteristics of ULPRO XLE Membrane

| Membrane | Material | Contact angle | Zeta potential (mV) | Mean Roughness, nm | Reference |
|---|---|---|---|---|---|
| ULPRO-XLE | Polyamide TFC | 46.9 | −19 | — | [Kimura et al. (2003)] |
| ULPRO-XLE | Polyamide TFC | 66 | — | 73 | [Xu and Drewes (2006)] |
| ULPRO-XLE | Polyamide TFC | 66.3 | −3.2 | 72.7 | [Xu et al. (2006)] |

K, Kimura, G. Amy, J. E. Drewes, T. Heberer, T.-U. Kim, Y. Watanabe, *Rejection of organic micropollutants (disinfection by-products, endocrine disrupting compounds, and pharmaceutically active compounds) by NF/RO membranes*, J. of Membrane Science 227 (2003) 113-121.

P. Xu, J. Drewes, *Viability of nanofiltration and ultra-low pressure reverse osmosis membranes for multi-beneficial use of methane produced water*, Separation and Purification Technology 52 (2006) 67-76.

P. Xu, J. E. Drewes, T.-U. Kim, C. Bellona, G. Amy, *Effect of membrane fouling on transport of organic contaminants in NF/RO membrane applications*, J. of Membrane Science 279 (2006) 165-175.

In Table 3, the Zeta potential for the ULPRO-XLE membrane with a contact angle of 46.9° was measured at pH=8 at 30 µS/cm with KCl. The Zeta potential for the ULPRO-XLE membrane with a contact angle of 66.3° was measured at pH=7.

Characterization Methods

Conductivity measurements were made with a conductivity meter (Metrohm 712), UV absorption at 700 nm with Shimadzu UV-visible spectrophotometer UV-1700 (for the determination of tannic acid concentration according to a colorimetric method described in APHA standard methods [APHA (1989)]) and Total Organic Carbon (TOC) with Shimadzu TOC-5000A analyzer. TOC analyzer was used as an indirect method of determination for PVP and PVA concentrations of feed or permeate or concentrate solutions, respectively.

Cross-Flow Filtration Mode

Figure 5:
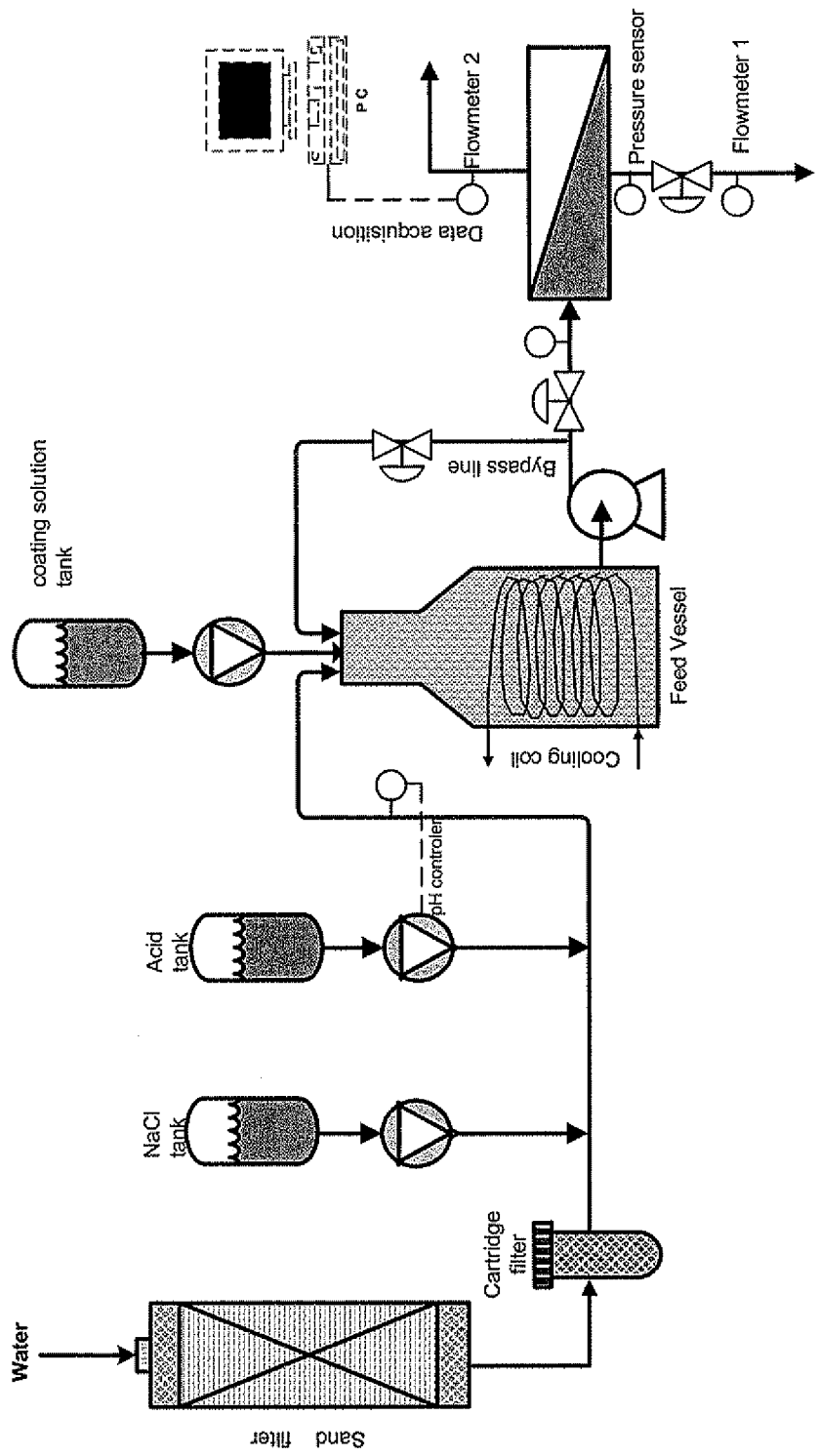
FIG. 5 is a schematic of the process used in the Experiments conducted in the Experiment Section in accordance with embodiments of the present invention.
Figure 6:
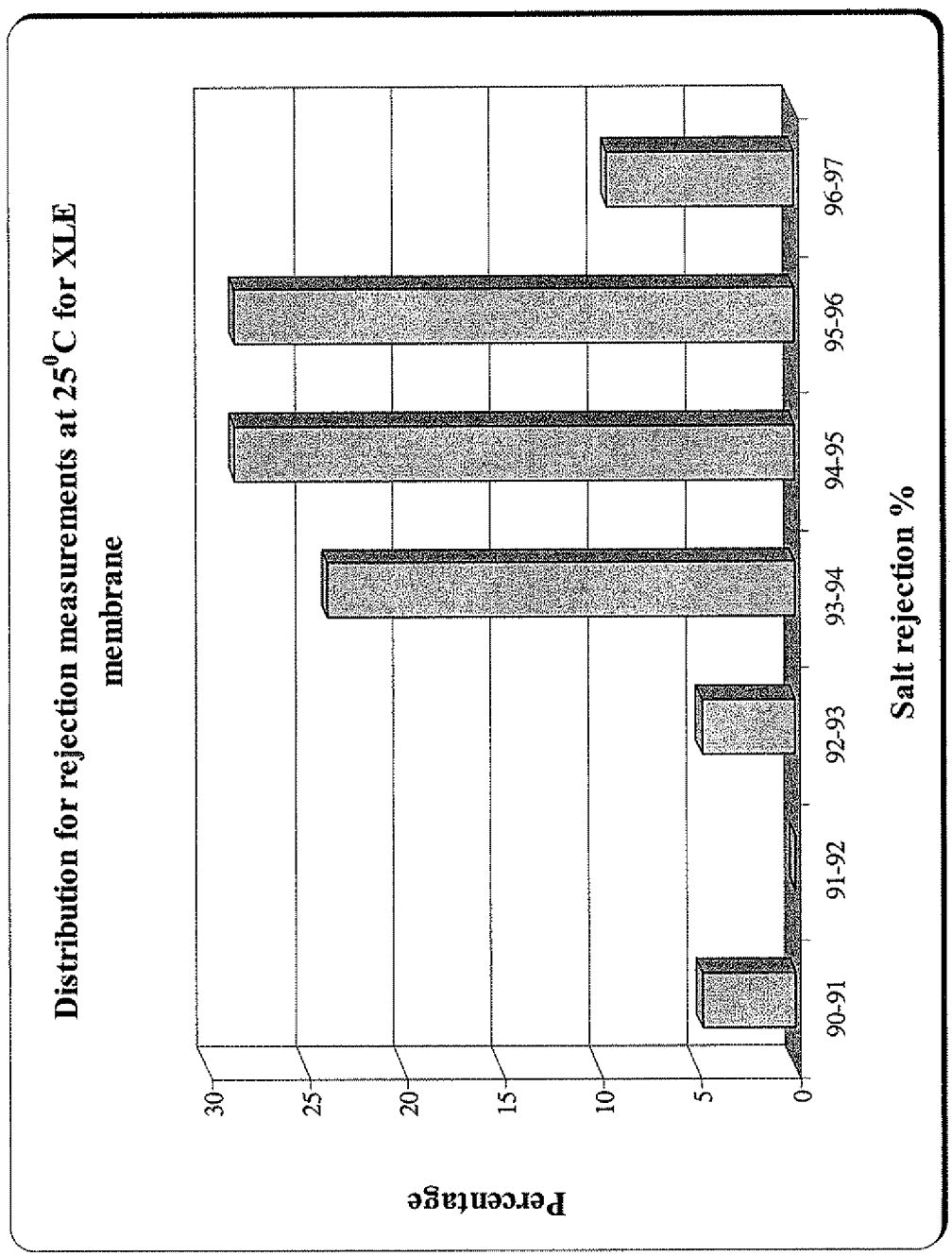
FIG. 6 is a graphical illustration of the distribution of salt rejection measurements at 25° C. for XLE membranes with water salinity of 2000 ppm in NaCl and an applied pressure of 150 psig in a dead-end mode in accordance with embodiments of the present invention.
Figure 7:
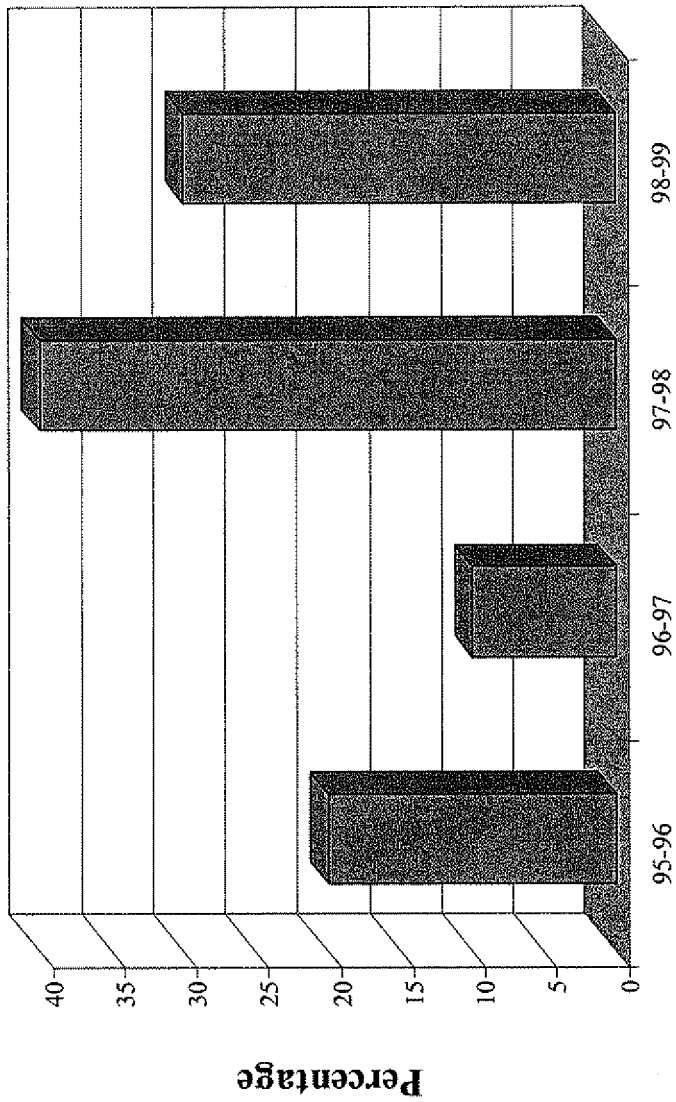
FIG. 7 is a graphical illustration of the distribution of salt rejection measurements at 25° C. for CPA2 membrane from Hydranauctics with water salinity of 2000 ppm in NaCl and an applied pressure of 150 psig in a dead-end mode in accordance with embodiments of the present invention.

Coating application tests in the cross-flow mode, which are quite representative of conditions prevailing in real membrane elements, were performed in a laboratory pilot unit with a narrow-gap, channel-type of test section, which employed flat sheet membrane pieces of active filtration area of 149 cm² as well as a common commercial net-type spacer. A schematic diagram of the experimental set-up is shown in FIG. 5 for open loop experiments. A 30 L vessel contained the feed solution which was circulated via a Grundfos CRNE2 pump. Pressure and cross-flow rate were monitored through digital sensors and controlled through two needle valves at the entrance and exit of the test section. Permeate flow was monitored through a Humonics 1,000 digital flowmeter connected to a PC for automatic data acquisition. Temperature was controlled in the system through a cooling coil connected to a water cooler at 30±0.1° C.

In all the experimental runs, a constant cross-flow feed rate of 0.7 L/min was maintained in the channel, which corresponds to a superficial cross-flow velocity of 19 cm/s. This value was within the range of typical cross-flow velocities encountered in spiral wound RO/NF membrane elements in practice.

Chemical cleaning of the membranes and the ensuing coating applications were performed in an off line procedure. The feed solution (i.e., alternatively, solutions for chemical cleaning and for coating application, in some cases) were re-circulated in the pilot unit under constant pressure, according to conditions described in the test protocol, in the following section and in Table 4.-

For long-term tests, open loop (i.e., once-through) operation was established by continuous feed introduction and disposal of treated water. The feed water (tap water) flow rate into the feed vessel was 1.8 L/min, and thus the mean residence time of water in the system was approximately 15 min. Feed water passed through a sand filter and a cartridge filter to reach a Silt Density Index (SDI) close to 2 and a turbidity typically less than 0.1 Nephelometric Turbidity Units (NTU), whereas raw water has usually an SDI between 3 and 4 and a turbidity usually less than 1 NTU. A concentrated NaCl solution (18% w/w) was diluted in line with tap water, to achieve the feed water salinity of 2,000 ppm to be fed to the cross flow test section. The experimental set-up shown in FIG. 5 was fully automated and could be operated practically unattended for a long period of time.

Dead-End Filtration Mode

The standard protocol for the post-treatment of membranes used in these Experiments included the steps described in Table 4. When samples from unused membranes were applied, the chemical cleaning steps (step Nos 4 and 5) were omitted.

In some experiments, it was decided to extend the duration of tests to almost 10 days, in order to examine the performance of the coated membrane. The cell equipped with the coated membrane, after the treatment described above, was filled with brackish water and was operated at constant temperature and stirring speed without applying pressure. Once a day, the cell was filled with fresh brackish water while pressure 150 psig was applied in order to determine the membrane flux and salt rejection. This short test lasted for almost one hour every day. The determination of membrane flux and rejection was considered to provide a reasonable estimate of the possible depletion of the coating layer on the membrane surface because of the continuous contact with the brackish water under constant agitation.

TABLE 4

Experimental protocol for PA RO membrane post-treatment.

| Step | Target | Feed | Pressure | Duration | Comments |
|---|---|---|---|---|---|
| 1 | Membrane preparation | — | — | — | |
| 2 | Membrane Compaction/Conditioning | Deionized water | 230 psig | 2 h | Applied pressure higher than the experimental pressure in order to get constant flux during the next steps. |
| 3 | Determination of Initial Flux with Brackish Water | Brackish water (2000 ppm NaCl) | 150 psig | 60 min | The pressure for this step was selected in order for the flux of brackish water after treatment to be near 25 LMH (~15 gal/ft$^2 \cdot$ d). The salinity was chosen as a typical value for brackish water. |
| 4 | Chemical cleaning with low pH solution | 2% citric acid (pH: 4.0) | — | 1 h | The cleaning solution was in contact with the active membrane layer. |
| 5 | Chemical cleaning with high pH solution | 2% STPP + 0.8% Na-EDTA (pH: 10.0) | — | 1 h | The cleaning solution was in contact with the active membrane layer. |
| 6 | Determination of Flux after chemical cleaning with Brackish Water | Brackish water (2000 ppm NaCl) | 150 psig | 60 min | |
| 7 | Coating with PVP or PVA and/or tannic acid | PVP or PVA and/or tannic acid solution (5-90 ppm) | (200 or 150 psig) | 30 min or 15 min | Duration for coating application was a parameter under study. |
| 8 | Determination of Flux after treatment with Brackish Water | Brackish water (2000 ppm NaCl) | 150 psig | 60 min | The pressure for this step was selected in order for the flux of brackish water after treatment to be near 25 LMH (~15 gal/ft$^2$d). The salinity was chosen as a typical value for brackish water. |
| 9 | Stirred Cell cleaning | Deionized water | — | — | |

Cross-Flow Filtration Mode

A standard protocol for coating experiments, in the cross-flow filtration mode, included 7 steps, excluding the membrane preparation and cell cleaning after the termination of each experiment. Prior to the experiment, a stored membrane sample, having the appropriate dimensions to fit to the cross-flow cell, was rinsed with deionized water and was placed inside the cell, while just above the membrane surface a piece of commercial spacer was used, of the same type as that employed in spiral wound RO membrane elements, for better flow distribution and realistic simulation of flow conditions.

The membrane pieces, before being used, were chemically cleaned according to manufacturer recommendations, with a low pH solution followed by a high pH solution. It is frequently mentioned in the literature that a certain period of time is required for conditioning a new membrane, which refers to membrane adjustment to the pressure applied and to the ionic environment of the feed water. However, if the samples employed for cross flow tests were cut from the old membrane, which was previously used, the procedure for compaction was limited to only 2 hours. After the first steps for membrane preparation, the initial flux and salt rejection were determined using brackish water of 2000 ppm salinity as feed water. The coating application (with the rejection enhancing agents) was followed either by recycling the coating solutions or by injecting a concentrated solution of polymers in the feed stream of brackish water. After that, the brackish water flux and salt rejection were monitored for a long period of time (up to almost 30 days). The feed water was a mixture of a concentrated solution of NaCl (18% w/w), diluted in line with tap water, to give a solution with a final sodium chloride concentration of 2,000 mg/L. Table 5 summarizes the steps followed for the post-treatment of membranes in cross flow filtration mode.

TABLE 5

Experimental protocol for PA RO membrane post-treatment in cross-flow filtration mode.

| Step | Target | Feed | Pressure | Duration | Comments |
|---|---|---|---|---|---|
| 1 | Membrane preparation | — | — | — | |
| 2 | Chemical cleaning with low pH solution | 2% citric acid (pH: 4.0) | 150 psig | 1 h | According to manufacturer recommendations. |
| 3 | Chemical cleaning with high pH solution | 2% STPP + 0.8% Na-EDTA (pH: 10.0) | 150 psig | 1 h | According to manufacturer recommendations. |
| 4 | Membrane Compaction/ Conditioning | Deionized or brackish water | 215 psig | 2 h | Applied pressure higher than the experimental pressure in order to get constant flux during the next steps. |
| 5 | Determination of Initial Flux with Brackish Water | Brackish water (2000 mg/L NaCl) | 150 psig | 1-18 h | The pressure for this step was selected in order for the flux of brackish water after treatment to be near 25 LMH (~15 gal/ft$^2$ · d), The salinity was chosen as a typical value for brackish water. |
| 7 | Coating with PVP or PVA and/or tannic acid | PVP or PVA and/or tannic acid solution (5-30 mg/L) | 200 or 150 psig | 30 or 15 min | |
| 8 | Determination of Flux after treatment with Brackish Water | Brackish water (2000 mg/L NaCl) | 150 psig | up to 30 d | The pressure for this step was selected in order for the flux of brackish water after treatment to be near 25 LMH (~15 gal/ft$^2$ · d). The salinity was chosen as a typical value for brackish water. |
| 9 | Cross flow cell cleaning | Deionized water | — | — | |

Initial Membrane Flux and Salt Rejection

Measurements were systematically taken regarding membrane performance (i.e. permeate flux and salt rejection) using dead-end as well as cross-flow filtration equipment. All the data indicated extensive PA layer spatial variability.

Data from tests in dead-end and cross-flow filtration modes, regarding initial membrane flux, without any post-treatment, with brackish water 2000 ppm in NaCl, and salt rejection, determined by electrical conductivity measurements are presented. Salt rejection and recovery have been obtained via the following formulae:

$$\text{Salt Rejection \%} = \left(1 - \frac{C_p}{C_f}\right) \times 100$$

$$\text{Recovery \%} = \frac{V_p}{V_f} \times 100$$

where:
$C_p$=NaCl concentration in permeate; this is substituted by electrical conductivity, in μS/cm, due to the linear dependence of conductivity on concentration,
$C_f$=NaCl concentration in feed solution, substituted by electrical conductivity, in μS/cm.
$V_p$=permeate volume
$V_f$=feed (brackish water) solution volume.

Distribution of Permeate Flux and Salt Rejection for New Membranes

FIGS. 6-9 depict the distribution of measured values for salt rejection determined from 21 random samples of XLE membrane and 10 samples of CPA2 membrane at 25° C., respectively. The samples tested that had a surface area of order $10^{-3}$ m$^2$ represent local conditions of the large membrane sheets, each with area of order 1 m$^2$, which comprise the commercial elements. Quite different values of salt rejection were determined from the various membrane samples used in the experiments, which can be attributed to the different characteristics at various sites of the membrane active layer.

Comparing the data from tests performed with XLE membrane with data from tests conducted with CPA2 membrane, it is evident that the former exhibits lower values for salt rejection (90.4-96.2% compared to 95.1-98.2) under the same experimental conditions. This is attributed to the different characteristics of membrane active layer. It appears, therefore, that the CPA2 membrane was 'tighter' and consequently more effective in salt rejection in comparison to the XLE membrane; which is in general agreement with the manufacturers specifications shown in Tables 1 and 2.

Figure 8:
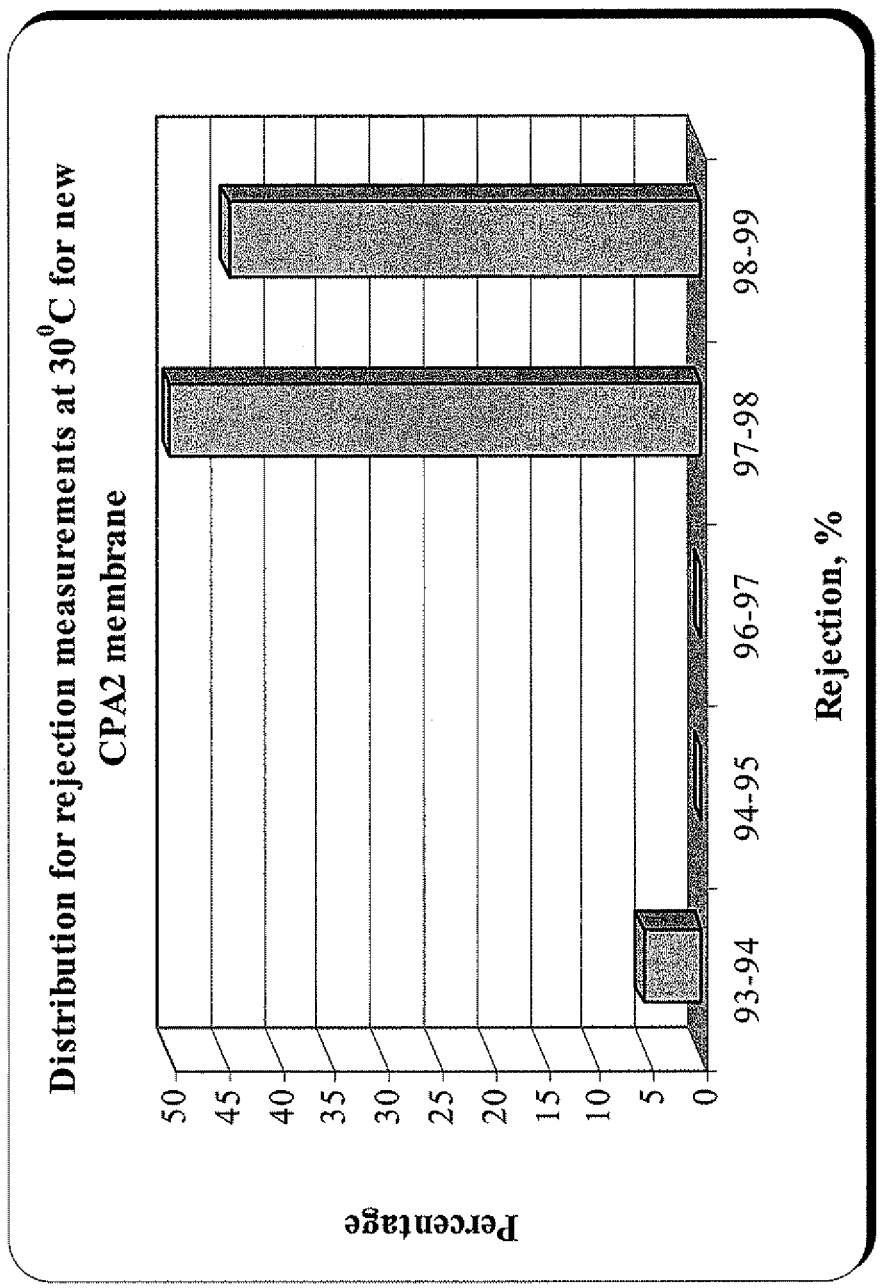
FIG. 8 is a graphical illustration of the distribution of salt rejection measurements at 30° C. for CPA2 membrane with water salinity of 2000 ppm in NaCl and an applied pressure of 150 psig in a dead-end mode in accordance with embodiments of the present invention.

FIG. 8 depicts the distribution of measured values for salt rejection determined from 20 different samples of CPA2 membrane at 30° C.

Cross-Flow Filtration Mode

Figure 9:
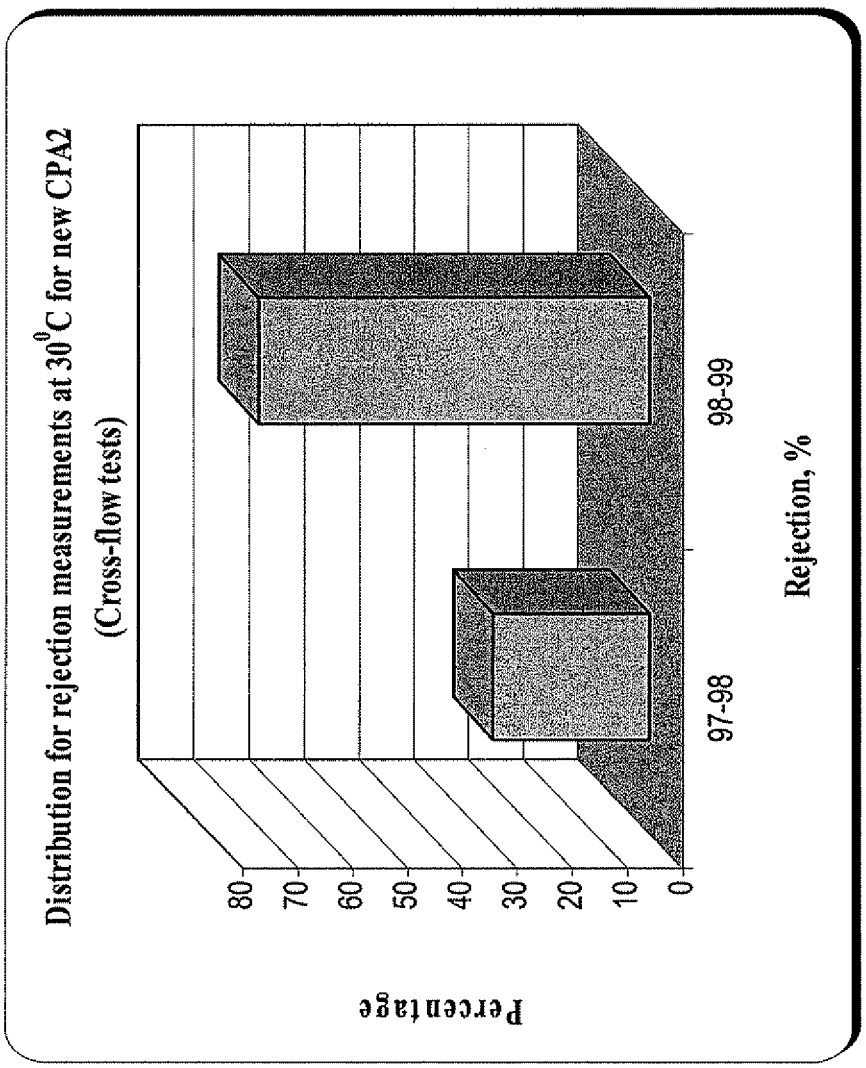
FIG. 9 is a graphical illustration of the distribution of salt rejection measurements at 30° C. for CPA2 membrane with water salinity of 2000 ppm in NaCl and an applied pressure of 150 psig in a cross-flow mode in accordance with embodiments of the present invention.
Figure 10:
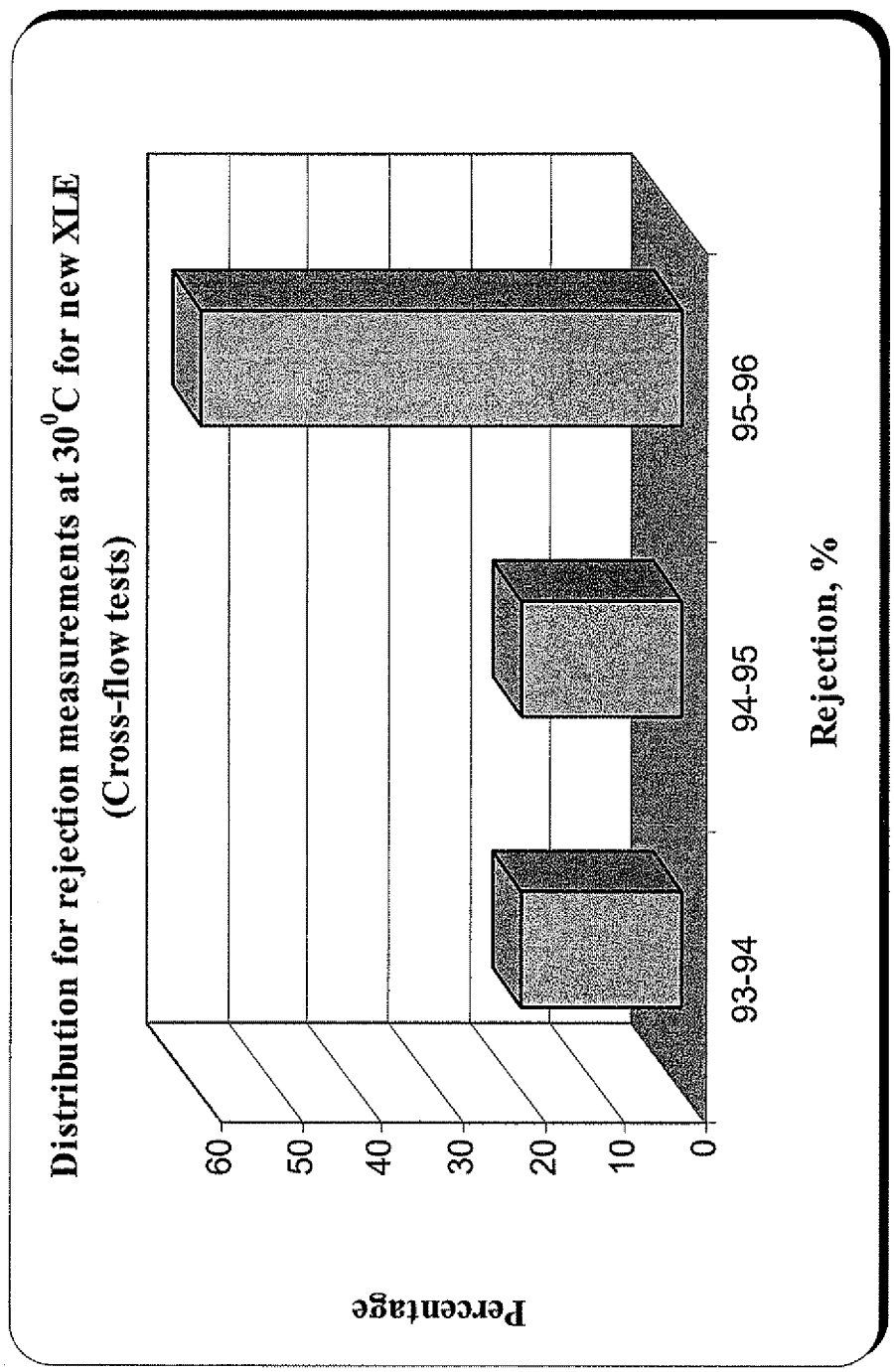
FIG. 10 is a graphical illustration of the distribution of salt rejection measurements at 30° C. for XLE membrane with water salinity of 2000 ppm in NaCl and an applied pressure of 150 psig in a cross-flow mode in accordance with embodiments of the present invention.

Data for salt rejection from 7 different samples of brand new "CPA2" membrane and from 5 different samples of brand new "XLE" membrane is presented in FIGS. 9 to 10. Tests were performed at 30° C. temperature in the cross-flow filtration mode. In this set of Experiments, the membrane surface area tested was quite larger than the membrane surface area in the dead-end filtration mode, ~149 cm$^2$ in the cross-flow test unit compared to 14.5 cm$^2$ in the dead-end test cell. As shown in FIG. 9, the data distributions is relatively narrow, compared to the data in FIG. 8. The difference in data distribution can be attributed to the fact that the former were obtained with membrane samples of area one order of magnitude larger than the latter; naturally, in large size samples, averaging of "local" rejection values leads to a smaller spread of the measured respective quantities. Similarly, narrow distributions are displayed in the measurements of FIG. 10, which were obtained with relatively large-size samples.

Distribution of Salt Rejection for the Used Membrane dom character of localized membrane surface non-uniformities, which tend to be smoothed out with increasing membrane area.

Increased fluid temperature (from 25° C. to 30° C.) has the expected effect of increasing permeate flux and rejection deterioration, as shown by comparing results in numbers 1 and 3 with 2 and 4, respectively.

TABLE 6

Statistical Parameters for the Experiments

| No tested | Type of membrane tested | Fitration mode | Testing temperature ° C. | No of different samples tested | Average value Flux, $L/m^2 \cdot h$ | Rejection, % | Standard deviation (SD) Flux, $L/m^2 \cdot h$ | Rejection, % | min value Flux, $L/m^2 \cdot h$ | max value Flux, $L/m^2 \cdot h$ | min value Rejection, % | max value Rejection, % |
|---|---|---|---|---|---|---|---|---|---|---|---|---|
| 1 | Brand new XLE | Dead-end | 25 | 21 | 33.8 | 94.4 | 3.82 | 1.36 | 25.5 | 38.2 | 90.39 | 96.18 |
| 2 | Brand new XLE | Dead-end | 30 | 7 | 39.0 | 91.1 | 5.89 | 2.05 | 27.9 | 43.7 | 88.88 | 94.09 |
| 3 | Brand new CPA2 | Dead-end | 25 | 10 | 19.8 | 97.2 | 2.38 | 1.02 | 15.6 | 22.4 | 95.13 | 98.21 |
| 4 | Brand new CPA2 | Dead-end | 30 | 18 | 24.8 | 97.7 | 3.00 | 1.17 | 16.2 | 28.7 | 93.24 | 98.59 |
| 5 | Brand new XLE | Cross-flow | 30 | 5 | 51.3 | 95.0 | 2.01 | 1.07 | 48.0 | 52.9 | 93.21 | 95.96 |
| 6 | Brand new CPA2 | Cross-flow | 30 | 7 | 22.5 | 98.1 | 0.81 | 0.30 | 21.4 | 23.9 | 97.7 | 98.4 |
| 7 | Used CPA2 (before chemical cleaning) | Dead-end | 30 | 24 | 26.9 | 94.6 | 4.17 | 3.48 | 17.9 | 35.5 | 81.88 | 98.42 |
| 8 | Used CPA2 (after chemical cleaning) | Dead-end | 30 | 24 | 31.2 | 91.8 | 5.53 | 5.80 | 20.9 | 38.8 | 76.46 | 97.52 |
| 9 | Used CPA2 (after chemical cleaning) | Cross-flow | 30 | 16 | 29.4 | 94.9 | 9.34 | 2.51 | 17.0 | 46.5 | 88.3 | 97.5 |

Dead-End Filtration Mode

Figure 11:
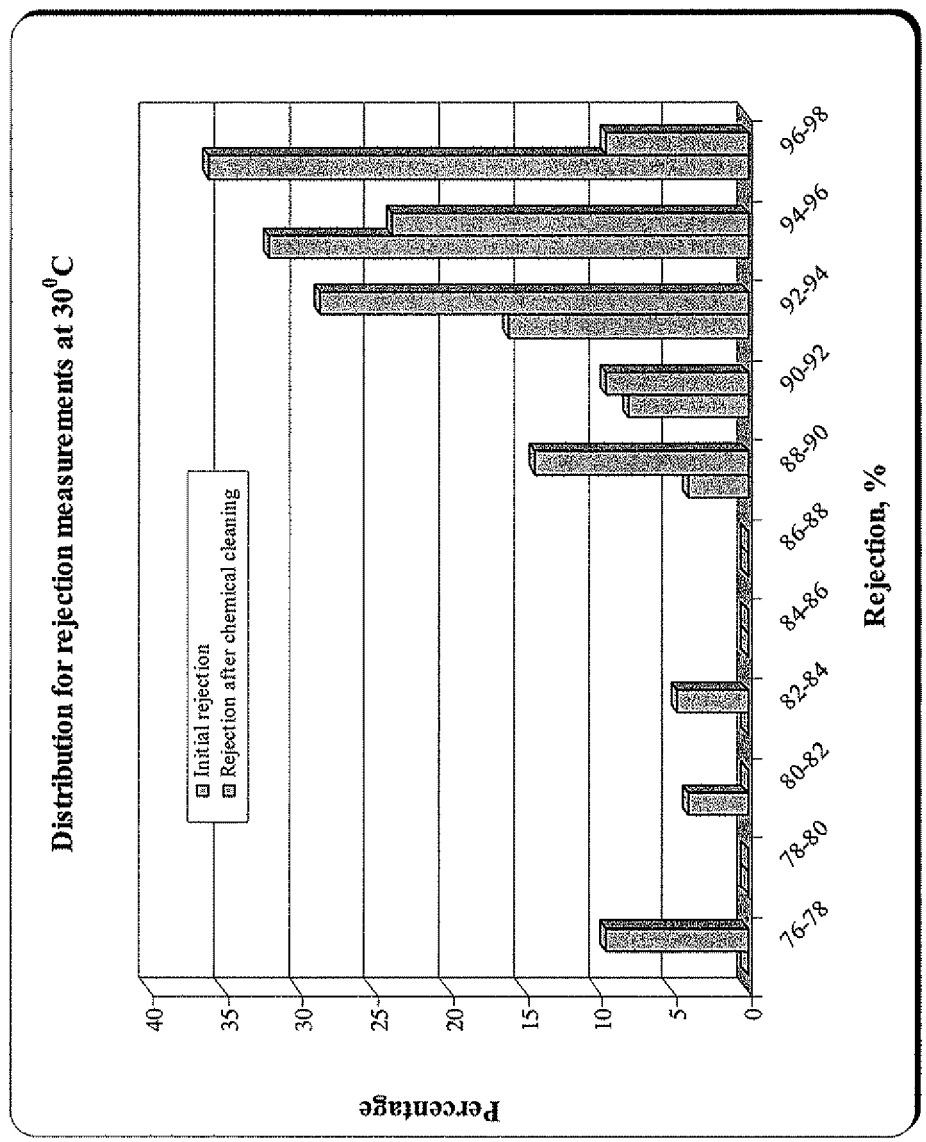
FIG. 11 is a graphical illustration of the distribution of salt rejection measurements at 30° C. for CPA2 membrane, before and after chemical cleaning, with water salinity of 2000 ppm in NaCl and an applied pressure of 150 psig in a dead-end mode in accordance with embodiments of the present invention.

Data regarding salt rejection measurements were obtained from 24 different samples cut from the used CPA2 membrane, which were tested in the dead-end stirred cell, before and after chemical cleaning. Chemical cleaning of the membrane was performed according to manufacturer recommendations, i.e. acidic cleaning with citric acid at pH 4, followed by alkaline cleaning at pH 10. FIG. 11 depicts the results from these measurements. It is evident that chemical cleaning causes a shift of the salt rejection distribution that moves to lower values, as one might have expected. Indeed, aside from the possibility of some membrane degradation by chemicals, the removal of likely existing foulants by chemical cleaning tends to reduce salt rejection.

Cross-Flow Filtration Mode

Figure 12:
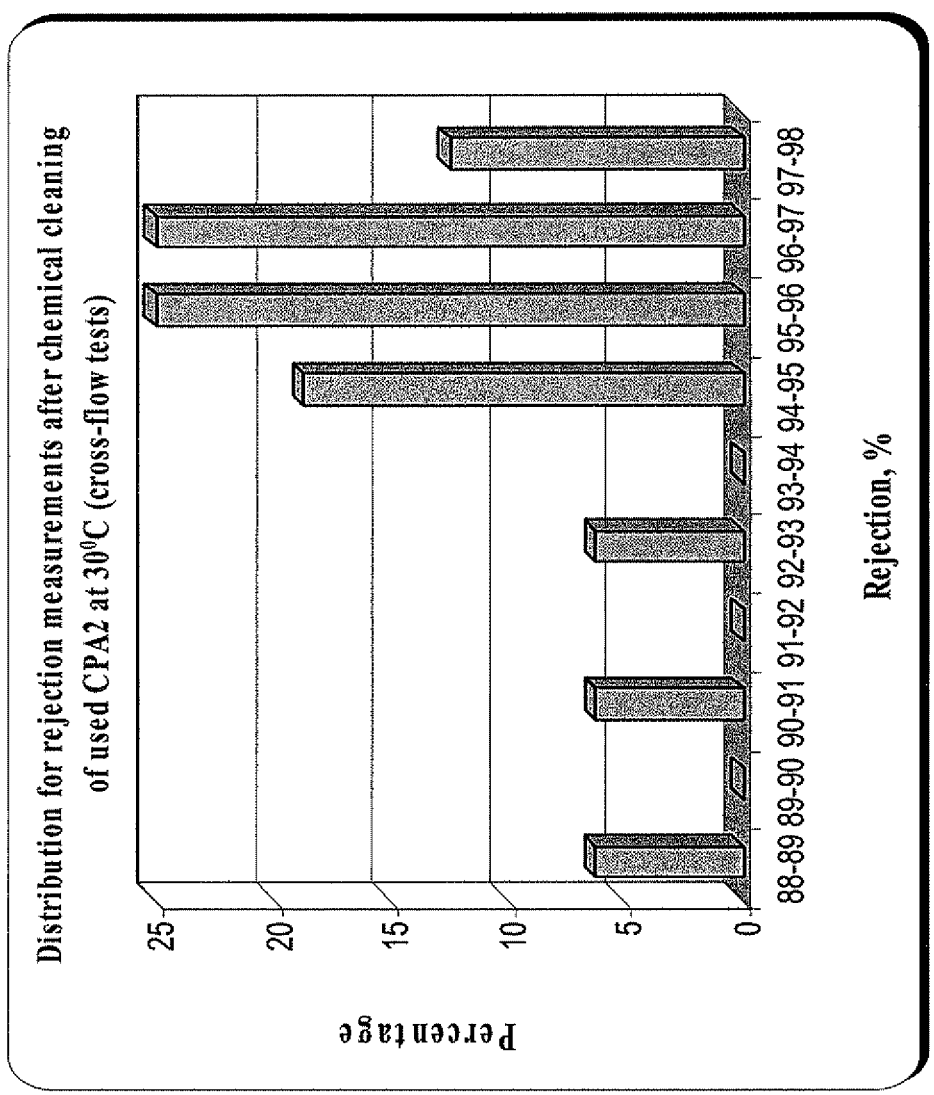
FIG. 12 is a graphical illustration of the distribution of salt rejection measurements at 30° C. for used CPA2 membrane, after chemical cleaning, with water salinity of 2000 ppm in NaCl and an applied pressure of 150 psig in a cross-flow mode in accordance with embodiments of the present invention.

FIG. 12 summarizes permeate salt rejection measurements with the cross-flow test unit, from 16 different samples of the used CPA2 membranes. All of the data was obtained after chemical cleaning of the membrane. Significant spread of the rejection values is also shown in this figure despite the fact that the membrane sample is 10 times larger than that of the dead-end tests (FIG. 11).

Finally, Table 6 summarizes some statistical parameters for all the data presented in FIGS. 6 to 12. As shown in Table 6, unused (i.e., brand new) membrane samples (nos. 1 through 6) exhibit a more narrow distribution of both flux and rejection, compared to used membrane sample before and after cleaning (nos. 7-9), which is reflected in the smaller standard deviation values. The difference in the distribution of data suggests that the used and chemically cleaned membranes have suffered some degradation.

For new membranes, the smaller size samples (dead-end mode, entry numbers 2 and 4) compared to larger ones (cross-flow mode, number 5 and 6, respectively) display a broader distribution of both flux and rejection, which is reflected in the standard deviation values. The data is indicative of the ran- Cross-Flow Tests Similar tests were performed to assess the effectiveness of membrane treatment with REA, in cross-flow filtration mode. The experimental conditions for these tests are summarized in Table 7. The "online application" refers to the procedure where the coating agents are applied on the membrane surface during the normal system operation by direct injection of these agents into the feed water stream. The advantage of this treatment is that it can be performed in desalination plants without disruption of operation; i.e. loss of operating time or water productivity. The Experiment Nos. 21C and 23C were performed for a long time period (up to almost one month) after the coating application, to determine the coating durability and its effectiveness regarding salt rejection.

TABLE 7

Experimental conditions in cross-flow tests.

| Test No | Coating | Applied Pressure, PSI | Duration of application, min | Duration of operation after coating, h |
|---|---|---|---|---|
| 9C | 10 ppm PVP + 10 ppm TA (online application) | 150 | 30-30 | 128 |
| 21C | 10 ppm PVP + 10 ppm TA (online application) | 150 | 30-30 | 504 |
| 23C | 10 ppm PVA + 10 ppm TA (online application) | 150 | 30-30 | 568 |

Figure 13:
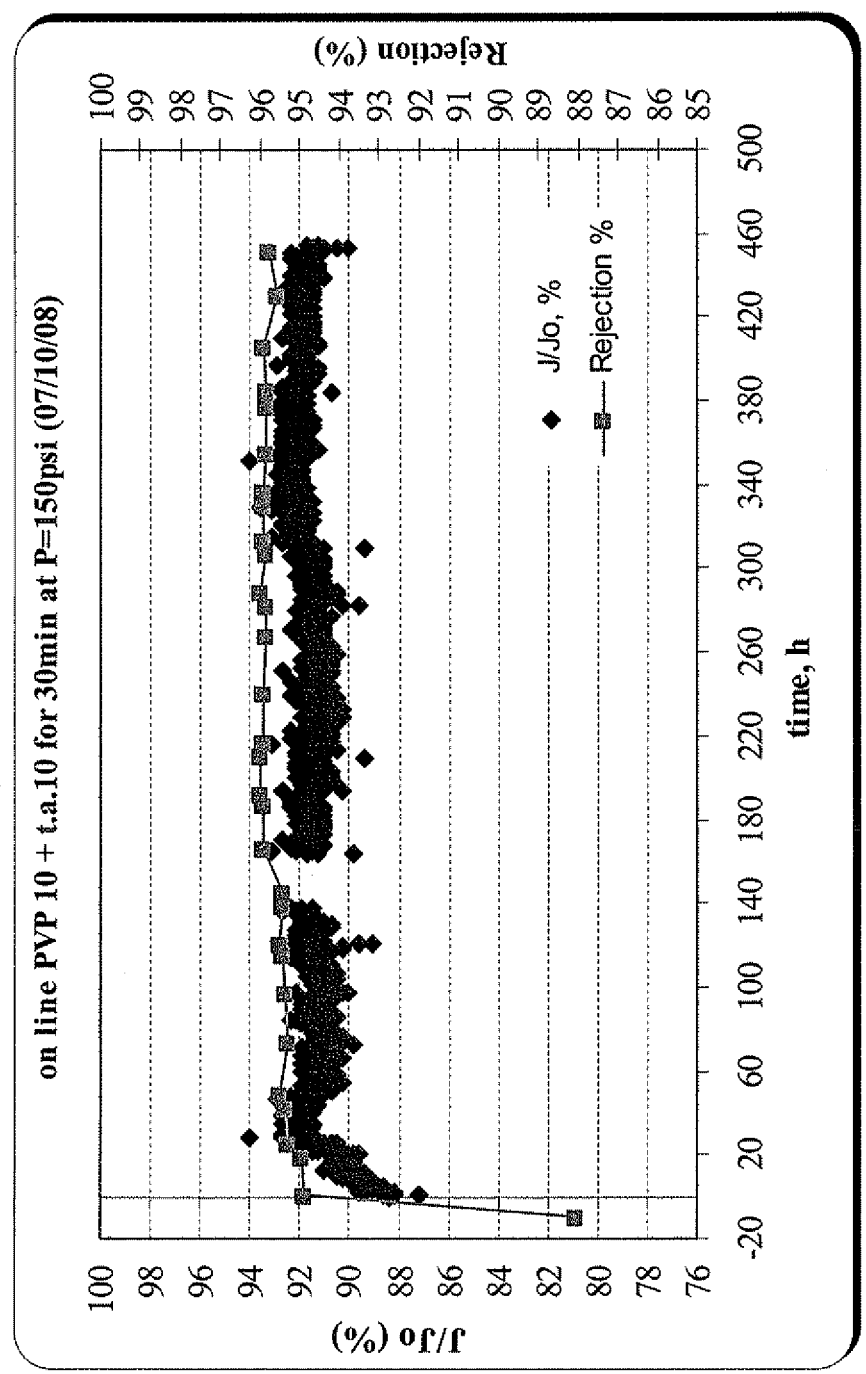
FIG. 13 is a graphical illustration of the normalized flux and salt rejection versus time after online membrane coating with 10 ppm PVP and 10 ppm tannic acid for 30 min at applied pressure 150 psig in accordance with Experiment Test No. 21C, which is in accordance with embodiments of the present invention.
Figure 14:
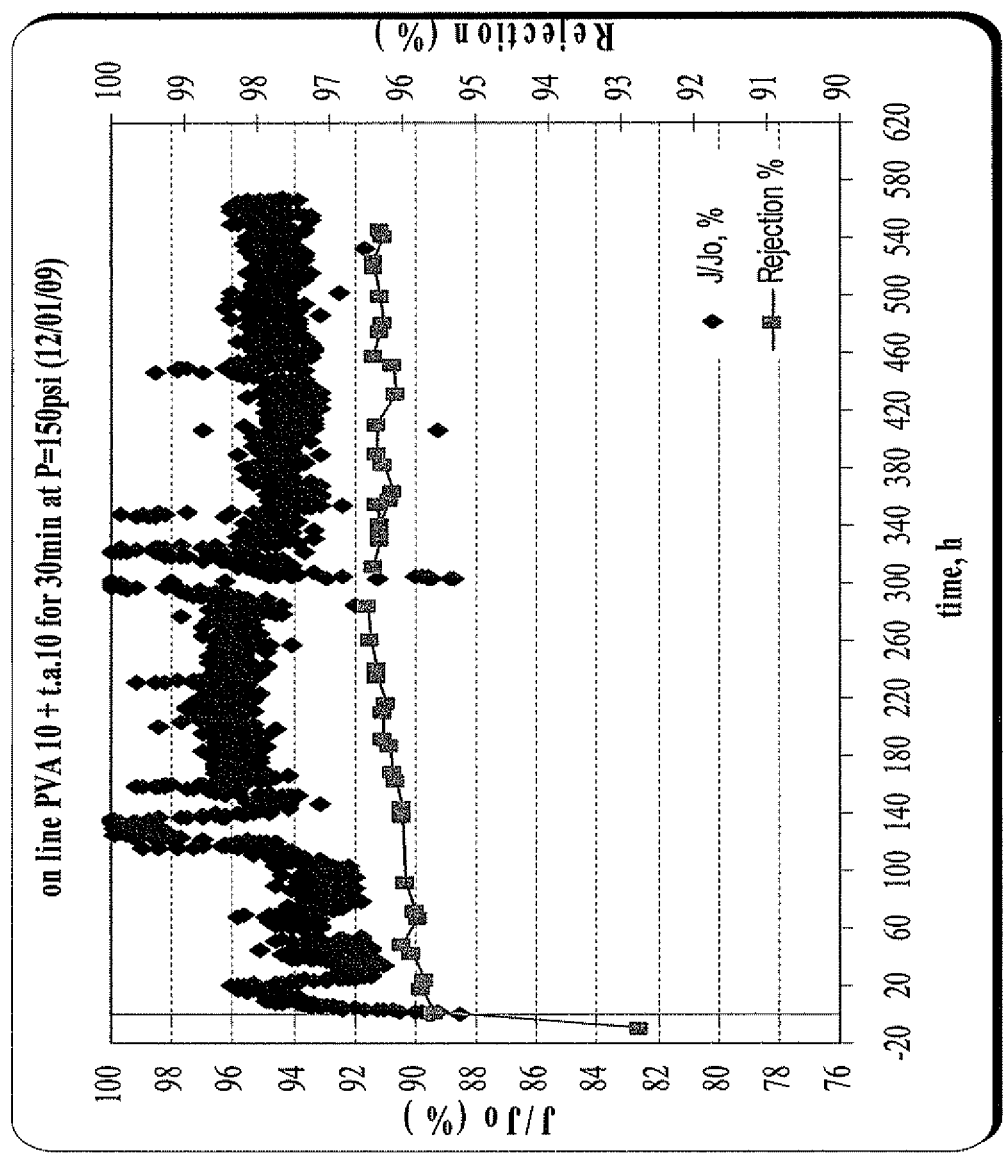
FIG. 14 is a graphical illustration of the normalized flux and salt rejection versus time after online membrane coating with 10 ppm PVA and 10 ppm tannic acid for 30 min at applied pressure 150 psig in accordance with Test No 23C, which is in accordance with embodiments of the present invention.

FIGS. 13-14 depict the data from the long-time tests (21C and 23C), where the used CPA2 membrane, after being chemically cleaned, were coated using either solutions with 10 ppm PVP plus 10 ppm TA (Experiment No. 21C) or 10 ppm PVA plus 10 ppm TA, through online application and applied pressure 150 psig. The tests, which lasted 21 days and 24 days, respectively, after coating application, show significant salt rejection improvement of the membrane (approximately 7.5% in Experiment 21C and 3.8% in test 23C), with a concomitant flux reduction of approx. 6% to 8% in all tests. This restored membrane performance remained almost constant for the entire experimental period of Experiment 21C.

As shown in FIG. 13, and in practically all cross-flow tests, during the first hours after coating application, there is a gradual increase in membrane flux, under constant salt rejection; this trend may be attributed to removal of excess or somewhat loosely bound coating. Finally, the largest rejection improvement (7.5% in absolute terms) was obtained in Experiment 21C, which is shown in FIG. 13, with a membrane sample that exhibited the smallest salt rejection (~88%) after chemical cleaning, i.e. before coating. The good membrane performance achieved in Experiment 21C remained practically constant for the long duration of the test whereas the flux was stabilized at about 92% with regard to the initial membrane flux measured right after chemical cleaning. These results indicate that the treatment applied was more effective in the case of significantly degraded membrane active layers.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A method of treating a used or degraded offline reverse osmosis membrane comprising the steps of:
    a. cleaning the used or degraded offline reverse osmosis membrane;
    b. contacting the reverse osmosis membrane with a rejection enhancing agent solution comprising polyvinylpyrrolidone or polyvinylalcohol and water for a predetermined time period under a predetermined applied trans-membrane pressure, where the rejection enhancing agent solution does not have a cloud point in a temperature range of from 34° C. and 60° C. and where the predetermined applied trans-membrane pressure is in a range of from greater than 150 psi to 200 psi; and
    c. contacting the reverse osmosis membrane with a tannic acid solution under the predetermined applied trans-membrane pressure to produce a reconditioned reverse osmosis membrane having reduced active layer defects and a salt rejection rate in a range of from 90% to 98%.

2. The method of claim 1, wherein the rejection enhancing agent solution further comprises from about 30 ppm to about 200 ppm sodium chloride.

3. The method of claim 1, wherein the polyvinylpyrrolidone or polyvinylalcohol is present in a range of about 5 ppm to about 30 ppm of the rejection enhancing agent solution.

4. The method of claim 1, wherein the tannic acid solution comprises from about 5 ppm to about 30 ppm tannic acid.

5. The method of claim 4, wherein the tannic acid solution further comprises from about 0.06 wt. % to about 0.38 wt. % citric acid.

6. The method of claim 1, wherein the predetermined time period ranges from about 15 minutes to about 30 minutes.

7. The method of claim 1, wherein the step of cleaning the reverse osmosis membrane comprises the steps of
    a. acid cleaning the reverse osmosis membrane at a first predetermined pH value; and
    b. alkaline cleaning the reverse osmosis membrane at a second predetermined pH value.

8. The method of claim 7, wherein the step of acid cleaning is performed using citric acid and the first predetermined pH value is about 4.

9. The method of claim 7, wherein the step of alkaline cleaning is performed using sodium tri-polyphosphate and EDTA or NaOH and the second predetermined pH value ranges from about 10 to about 10.5.

10. The method of claim 1, wherein the method is performed at a temperature greater than about 34° C.

11. A method of treating a used or degraded offline reverse osmosis membrane comprising the steps of:
    a. acid cleaning the used or degraded offline reverse osmosis membrane at a first predetermined pH value;
    b. alkaline cleaning the reverse osmosis membrane at a second predetermined pH value;
    c. contacting the reverse osmosis membrane with a rejection enhancing agent solution comprising polyvinylpyrrolidone or polyvinylalcohol and water for a predetermined time period under a predetermined applied trans-membrane pressure, where the rejection enhancing agent solution does not have a cloud point in a temperature range of from 34° C. and 60° C. and where the predetermined applied trans-membrane pressure is in a range of from greater than 150 psi to 200 psi; and
    d. contacting the reverse osmosis membrane with a tannic acid solution comprising tannic acid and citric acid under the predetermined applied trans-membrane pressure to produce a reconditioned reverse osmosis membrane having reduced active layer defects and a salt rejection rate in a range of from 92% to 98%.

12. The method of claim 11, wherein the sodium chloride is present in the rejection enhancing agent solution in a range from about 30 ppm to about 200 ppm.

13. The method of claim 11, wherein the polyvinylpyrrolidone or polyvinylalcohol is present in a range of about 5 ppm to about 30 ppm of the rejection enhancing agent solution.

14. The method of claim 11, wherein the tannic acid solution comprises from about 5 ppm to about 30 ppm tannic acid.

15. The method of claim 14, wherein the citric acid is present in the tannic acid solution in a range from about 0.06 wt. % to about 0.38 wt. %.

16. The method of claim 11, wherein the predetermined time period ranges from about 15 minutes to about 30 minutes.

17. The method of claim 11, wherein the step of acid cleaning is performed using citric acid and the first predetermined pH value is about 4.

18. The method of claim 11, wherein the step of alkaline cleaning is performed using sodium tri-polyphosphate and EDTA or NaOH and the second predetermined pH value ranges from about 10 to about 10.5.

19. The method of claim 11, wherein the method is performed at a temperature greater than about 34° C.

20. The method of claim 1 where the step of contacting the reverse osmosis membrane with rejection enhancing agent solution occurs after the step of cleaning the used or degraded offline reverse osmosis membrane and where the step of contacting the reverse osmosis membrane with a tannic acid solution occurs after the step of contacting the reverse osmosis membrane with a rejection enhancing agent solution.

21. The method of claim 1 further comprising the step of determining a rate of flux using brackish water.

* * * * *

UNITED STATES PATENT AND TRADEMARK OFFICE
CERTIFICATE OF CORRECTION

PATENT NO. : 9,216,385 B2 Page 1 of 1
APPLICATION NO. : 12/897192
DATED : December 22, 2015
INVENTOR(S) : Nicos P. Isaias, Anastasios J. Karabelas and Sultana T. Mitrouli It is certified that error appears in the above-identified patent and that said Letters Patent is hereby corrected as shown below:

In the Claims

In Column 23, Line 64, Claim 1, the third to last word appears as "90%" and should read --92%--.

In Column 24, Line 12, Claim 7, the last word appears as "of" and should read --of;--.

In Column 25, Line 4, Claim 20, the phrase "with rejection" should read as --with a rejection--.

Signed and Sealed this
Twelfth Day of April, 2016

Michelle K. Lee
*Director of the United States Patent and Trademark Office*